(12) United States Patent
Parruck et al.

(10) Patent No.: US 6,229,812 B1
(45) Date of Patent: May 8, 2001

(54) SCHEDULING TECHNIQUES FOR DATA CELLS IN A DATA SWITCH

(75) Inventors: Bidyut Parruck, San Jose; Chetan V. Sanghvi, Fremont, both of CA (US); Vinay Kumar Bhasin, Raipur (IN); Makarand Dharmapurikar, Nanded (IN); Uday Govind Joshi, Bombay (IN)

(73) Assignee: Paxonet Communications, Inc., Fremont, CA (US)

( * ) Notice: Subject to any disclaimer, the term of this patent is extended or adjusted under 35 U.S.C. 154(b) by 0 days.

(21) Appl. No.: 08/872,530

(22) Filed: Jun. 11, 1997

Related U.S. Application Data

(60) Provisional application No. 60/029,652, filed on Oct. 28, 1996.

(51) Int. Cl.$^7$ .................................................. H04L 12/56
(52) U.S. Cl. ........................................... 370/412; 370/395
(58) Field of Search .................................... 370/411, 412, 370/413, 414, 415, 416, 417, 418, 395, 419, 388, 378, 381, 386, 389, 429; 710/39, 40, 240, 241, 29, 28, 52; 395/200.7, 200.71, 856, 858, 859, 860, 861, 862, 872

(56) References Cited

U.S. PATENT DOCUMENTS

| | | | |
|---|---|---|---|
| 5,499,238 | * 3/1996 | Shon | 370/411 |
| 5,500,588 | * 3/1996 | McKeown | 370/412 |
| 5,550,823 | 8/1996 | Irie et al. | |
| 5,557,035 | 9/1996 | Hayter et al. | |
| 5,570,348 | 10/1996 | Holden | |
| 5,629,933 | * 5/1997 | Delp et al. | 370/411 |
| 5,629,937 | * 5/1997 | Hayter et al. | 370/412 |
| 5,689,506 | * 11/1997 | Chiussi et al. | 370/412 |
| 5,748,614 | * 5/1998 | Wallmeier | 370/412 |
| 5,870,629 | * 2/1999 | Borden et al. | 370/412 |
| 5,872,769 | * 2/1999 | Caldara et al. | 370/413 |

\* cited by examiner

*Primary Examiner*—Chi H. Pham
*Assistant Examiner*—Steven Nguyen
(74) *Attorney, Agent, or Firm*—Martine Penilla & Kim, LLP

(57) ABSTRACT

A computer-implemented method for scheduling cells output on an output path of a data switch. The data switch is configured for switching the cells from a plurality of input paths to the output path. The method includes providing a plurality of queues, each queue of the plurality of queues having an assigned weight, respective ones of the plurality of input paths being coupled to respective ones of the plurality of queues. The method further includes providing a plurality of queues of queues. The plurality of queues being coupled to the plurality of queues of queues with queues of the plurality of queues having a similar weight being coupled a same queue of queues of the plurality of queues of queues. There is further included providing a scheduler, the plurality of queues of queues being input into the scheduler, the scheduler being coupled to the output path.

13 Claims, 22 Drawing Sheets

ATM SWITCH

HYBRID SWITCH

|  | Static Weight | Dynamic Weight | | | | | | | | | | | | | | Row # |
|---|---|---|---|---|---|---|---|---|---|---|---|---|---|---|---|---|
| Queue of Queue | | | | | | | | | | | | | | | | |
| X | 1 | 1 | 0 | 0 | 0 | 0 | 0 | 0 | 0 | 0 | 0 | 0 | 0 | 0 | 0 | 1 |
| Y | 2 | 2 | 2 | 1 | 0 | 0 | 0 | 0 | 0 | 0 | 1 | 0 | 0 | 0 | 0 | 2 |
| Z | 4 | 4 | 4 | 4 | 3 | 2 | 1 | 0 | 0 | 2 | 1 | 0 | 0 | 0 | 0 | 3 |
|  |  |  |  |  |  |  |  |  |  |  |  |  |  |  |  | 4 |

| Output | X | Y | Z | Z | Y | Z | Z | Z | X | Y | Z | Z | Y | Z |
|---|---|---|---|---|---|---|---|---|---|---|---|---|---|---|
| Column # | 1 | 2 | 3 | 4 | 5 | 6 | 7 | 8 | 9 | 10 | 11 | 12 | 13 | 14 |

| Queue of Queue | Static Period | \multicolumn{22}{c}{Static Period Current Count} | | | | | | | | | | | | | | | | | | | | | | |
|---|---|---|---|---|---|---|---|---|---|---|---|---|---|---|---|---|---|---|---|---|---|---|
| X | 1 | 0 | 1 | 0 | 0 | 0 | 1 | 0 | 1 | 0 | 1 | 0 | 1 | 0 | 1 | 0 | 1 | 0 | 1 | 0 | 1 | 0 |
| Y | 3 | 2 | 0 | 3 | 2 | 1 | 0 | 3 | 2 | 1 | 0 | 3 | 2 | 1 | 0 | 3 | 2 | 1 | 0 | 3 | 2 | 1 |
| Z | 3 | 2 | 1 | 0 | 3 | 2 | 1 | 0 | 3 | 2 | 1 | 0 | 3 | 2 | 1 | 0 | 3 | 2 | 1 | 0 | 3 | |

| Row # |
|---|
| 1 |
| 2 |
| 3 |
| 4 |

| Output | x | y | z | x | y | x | z | x | z | x | y | x | z | x | y | x | z | x | y | x | z | x |
|---|---|---|---|---|---|---|---|---|---|---|---|---|---|---|---|---|---|---|---|---|---|---|
| Column # | C1 | C2 | C3 | C4 | C5 | C6 | C7 | C8 | C9 | C10 | C11 | C12 | C13 | C14 | C15 | C16 | C17 | C18 | C19 | C20 | C21 | C22 |

SCHEDULING TECHNIQUES FOR DATA CELLS IN A DATA SWITCH

This application claims priority under 35 U.S.C 119 (e) of a provisional application entitled "Asynchronous Switching Architectures Having Connection Buffers" filed Oct. 28, 1996 by inventor Bidyut Parruck, et al. (U.S. application Ser. No. 60/029,652).

BACKGROUND OF THE INVENTION

The present invention relates to digital data networks. More particularly, the present invention relates to apparatus and methods for improving communication among devices that are coupled to Asynchronous Transfer Mode (ATM) digital data networks.

Asynchronous Transfer Mode (ATM) is an emerging technology in the fields of telecommunication and computer networking. ATM permits different types of digital information (e.g., computer data, voice, video, and the like) to intermix and transmit over the same physical medium (i.e., copper wires, fiber optics, wireless transmission medium, and the like). ATM works well with ata networks, e.g., the Internet, wherein digital data from a plurality of communication devices such as video cameras, telephones, television sets, facsimile machines, computers, printers, and the like, may be exchanged.

To facilitate discussion, prior art FIG. 1 illustrate a data network 100, including an ATM switch 102 and a plurality of communication devices 104, 106, 108, 110, and 112. ATM switch 102 may represent a digital switch for coupling, for either bidirectional or unidirectional transmission, two or more of the communication devices together for communication purpose and may represent a data network such as a local area network (LAN), a wide area network (WAN), or the global data network popularly known as the Internet. Each of communication devices 104, 106, 108, 110, and 112 is coupled to ATM switch 102 via a respective ATM port 104($p$), 106($p$), 108($p$), 110($p$), and 112($p$). Each ATM port may include circuitry to translate data from its communication device into an ATM data format for transmission via ATM switch 102, and to translate ATM data transmitted via ATM switch 102 into a data format compatible with that communication device.

Irrespective of the source, data is transformed into an ATM data format prior to being transmitted via an ATM-enabled network. As is well known, typical ATM data cell includes a header portion and a data portion. Cell header portion may include information regarding the type of information being encapsulated in the ATM data cell the destination for that information, and the like. Cell data portion typically includes the information being sent. By standardizing the format of the ATM cells, information from different communication devices may be readily intermixed and transmitted irrespective of its original format.

In the implementation of ATM technology in a data network, the challenge has been to improve the efficiency with which ATM switch 102 handles multiple simultaneous connections among the multiple communication devices. For peak efficiency, it is generally desirable to have an ATM switch that can handle a very large number of simultaneous connections while switching ATM data cells with minimal delay and maximum data integrity. Unfortunately, the high bandwidth demanded by such a design generally results in a prohibitively expensive ATM switch.

In the prior art, many ATM switch architectures have been proposed in the attempt to balance between switching capabilities and cost. In the FIGS. that follow, a convention has been adopted for ease of illustration and understanding. It is assumed herein that ATM ports on the left side of a depicted ATM switch represents ATM input ports. Contrarily, ATM ports illustrated on the right side of a depicted ATM switch represent ATM output ports. In reality, most ATM ports are bidirectional and may be disposed at any location relative to the ATM switch. Furthermore, although only a few ATM ports are shown herein, the number of ATM ports coupled to a given ATM switch is theoretically unlimited. Accordingly, the convention is employed to facilitate discussion only and is not intended to be limiting in any way.

FIG. 2A is a prior art illustration depicting an ATM switch architecture known as an input buffer switch. Input buffer switch 200 of FIG. 2 typically includes a switch matrix 202, which may represent a memory-less switching matrix for coupling data paths from one of input buffers 104($q$), 108($q$), and 110($q$) to one of ATM output ports 10($p$) and 112($p$). Input buffers 104($q$), 108($q$), and 110($q$) represent the memory structures for temporary buffering ATM data cells from respective ATM input ports 104($p$), 106($p$), and 108($p$). ATM ports 104($p$)–112($p$) were discussed in connection with FIG. 1 above.

To reduce implementation cost, switch matrix 202 is typically a low bandwidth switch and can typically handle only a single data connection to a given output port at any given point in time. Consequently, when both ATM input ports 104($p$) and 108($p$) need to be coupled to ATM output port 110($p$), switch matrix 202 typically needs to arbitrate according to some predefined arbitration scheme to decide which of the two data paths, 104($p$)110($p$) or 108($p$)/110($p$), may be switched first. For discussion purposes, assume that switch matrix 202 is arbitrated to ATM input port 104($p$), thereby coupling it to ATM output port 10($p$). In this case, ATM cells are transmitted from ATM input ports 104($p$) to ATM output port 10(($p$). ATM cells at ATM input port 108($p$) are buffered in input buffer 108($q$) while waiting for ATM port input 108($p$) to be coupled to ATM output port 110($a$). The buffered ATM cells are shown representatively in input buffer 108($q$) as cells 204 and 206.

It has been found that the performance of input buffer switch 200 suffers from a phenomenon called "end-of-the-line blocking." To explain this phenomenon, assume that ATM cell 204 needs to be delivered to ATM output port 110($p$) and therefore must wait until switch matrix 202 can couple ATM input port 108($p$) with ATM output port 110($p$). ATM cell 206, however, is destined for ATM output port 112($p$). Nevertheless, ATM cell 206 is blocked by ATM cell 204, and must also wait until ATM cell 204 is first delivered to ATM output port 110($p$). ATM cell 206 must wait even though it is not destined for ATM output port 110($p$). Head-of-the-line blocking occurs when data buffering is performed on a per-input port basis, i.e., ATM cells from a given input port are queued together prior to being switched irrespective of the final destinations of the individual ATM cells. A high degree of head-of-the-line blocking is detrimental to the performance of input buffer switch 202 since it limits the throughput of ATM cells through the ATM switch.

Output buffer switch 230 of FIG. 2B represents another prior ATM switch architecture in which performance is maximized, albeit at a high cost. Output buffer switch 230 has output buffers 110($q$) and 112($q$) coupled to respective ATM output ports 110($p$) and 112($p$) for buffering the ATM cells output by switch matrix 232. For maximum performance, switch matrix 232 may represent a high bandwidth switch matrix capable of coupling multiple input ports to a single output port. For example, switch matrix 232 may couple ATM data from all three ATM input ports 104(p), 106(p), and 108(p) to output buffer 110(q) and output port 110((p). In other words, switch matrix 232 is capable of making N connections simultaneously to a single output port, where N represents the number of ATM input ports (i.e., 3 in the example of FIG. 2B). Compared to switch matrix 202 of FIG. 2A, switch matrix 232 of FIG. 2B typically requires N times the bandwidth to handle N simultaneous connections.

Output buffers, as mentioned, buffer ATM cells output by switch matrix 232. Since an output buffer, e.g., output buffer 110(q), may accept data from multiple different sources simultaneously via switch matrix 232, it is typically provided with N times the bandwidth of analogous input queue, e.g., input queue 104(q) of FIG. 2A. Although output buffer switch 230 suffers no performance degradation due to head-of-the-line blocking, the requirement of a high bandwidth switch matrix and multiple high bandwidth output buffers renders output buffer switch 230 expensive to build and maintain.

To reduce cost, a central output buffer switch- architecture has also been proposed in the prior art. In the central output buffer switch architecture, switch matrix 232 may be endowed with a single central high bandwidth output buffer, which may be selectively coupled in a multiplexed manner in each ATM output ports 110(p) and 112(p). The central high bandwidth output buffer queues cells from the multiple ATM input ports and transmits them over time to the destination ATM output port. In this manner, individual output buffers, e.g., output buffers 110(q) and 112(q) of FIG. 2B, are eliminated. Since only one high bandwidth output buffer is required, the cost of implementing the central output buffer switch is generally lower compared to the cost of implementing the ATM output buffer switch. However, the requirement of a single large central output buffer still renders the central buffer switch architecture uneconomical for most applications. Further, the central buffer switch is typically configured for a fixed size network and does not lend itself to scalability. Additionally, the existence of the central output buffer renders the management centralized and complex.

FIG. 2C illustrates a prior art hybrid switch 260, representing another prior ATM switch architecture which attempts to tradeoff performance and cost. In hybrid switch 260, switch matrix 262 includes a central output buffer switch having a small central output buffer 264. Switch matrix 262 represents the high-bandwidth switch matrix similar to that discussed in FIG. 2B. However, small central output buffer 264 is typically smaller than the fill-bandwidth buffer employed in the central output buffer switch architecture of FIG. 2B, making the hybrid implementation less costly than the central output buffer switch architecture.

To enable the use of small central output buffer 264, data buffering is also performed on the input ports. FIG. 2C shows input buffers 104(q), 106(q), and 108(q), which are coupled to respective ATM input ports 104(p), 106(p), and 108(p). During operation, small central output buffer 264 is employed to buffer cells output by switch matrix 262. When small central output buffer 264 is full, input buffering is performed at individual ATM input ports. When this happens, the input buffers are said to be back-pressured by the switch matrix. Back-pressuring an input buffer results in the input buffer being employed for buffering the incoming ATM cells. As discussed in connection with FIG. 2A, the use of input buffering on the ATM input ports disadvantageously presents the possibility of performance degradation due to head-of-the-line blocking.

As can be appreciated from the foregoing, ATM switch designers are constantly searching for ways to improve switch performance and to lower implementation cost. Particularly, there are desired improved ATM switching architectures and methods therefor that advantageously maximize ATM cell throughput for multiple simultaneous connections. The desired ATM switching architectures and methods therefor preferably include structures and techniques for minimizing head-of-the-line blocking and for controlling the throughput of individual connections in order to improve traffic control through the switch, thereby maximizing performance for an ATM switch of a given size.

SUMMARY OF THE INVENTION

The invention relates, in one embodiment, to a computer-implemented method for scheduling cells output on an output path of a data switch. The data switch is configured for switching the cells from a plurality of input paths to the output path. The method includes providing a plurality of queues, each queue of the plurality of queues having an assigned weight, respective ones of the plurality of input paths being coupled to respective ones of the plurality of queues. The method further includes providing a plurality of queues of queues. The plurality of queues being coupled to the plurality of queues of queues with queues of the plurality of queues having a similar weight being coupled a same queue of queues of the plurality of queues of queues. There is further included providing a scheduler, the plurality of queues of queues being input into the scheduler, the scheduler being coupled to the output path.

Various embodiments are also provided to improve the bandwidth of the switch and to reduce cell burstiness. In one embodiment, the weights of the queues of queues are employed as static weights. Dynamic weights, which are based on the static weights of the queues of queues, are then derived and employed to schedule the cells for output in accordance with an aggregate modified weighted round robin (AMWRR) scheduling technique to reduce cell burstiness. In other embodiments, periods based on static weights are derived and employed to schedule the cells for output in accordance with period-based scheduling techniques to permit the entire bandwidth of the scheduler to be employed.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 10 is a table illustrating, in one embodiment of the present invention, the use of dynamic weights to schedule cells for output.

FIG. 13 is a table illustrating, in one embodiment of the present invention, an example of the inventive period-based scheduling technique.

FIG. 17 illustrates another example of the period-based scheduling technique wherein substantially the entire bandwidth of the scheduler is employed.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 3:
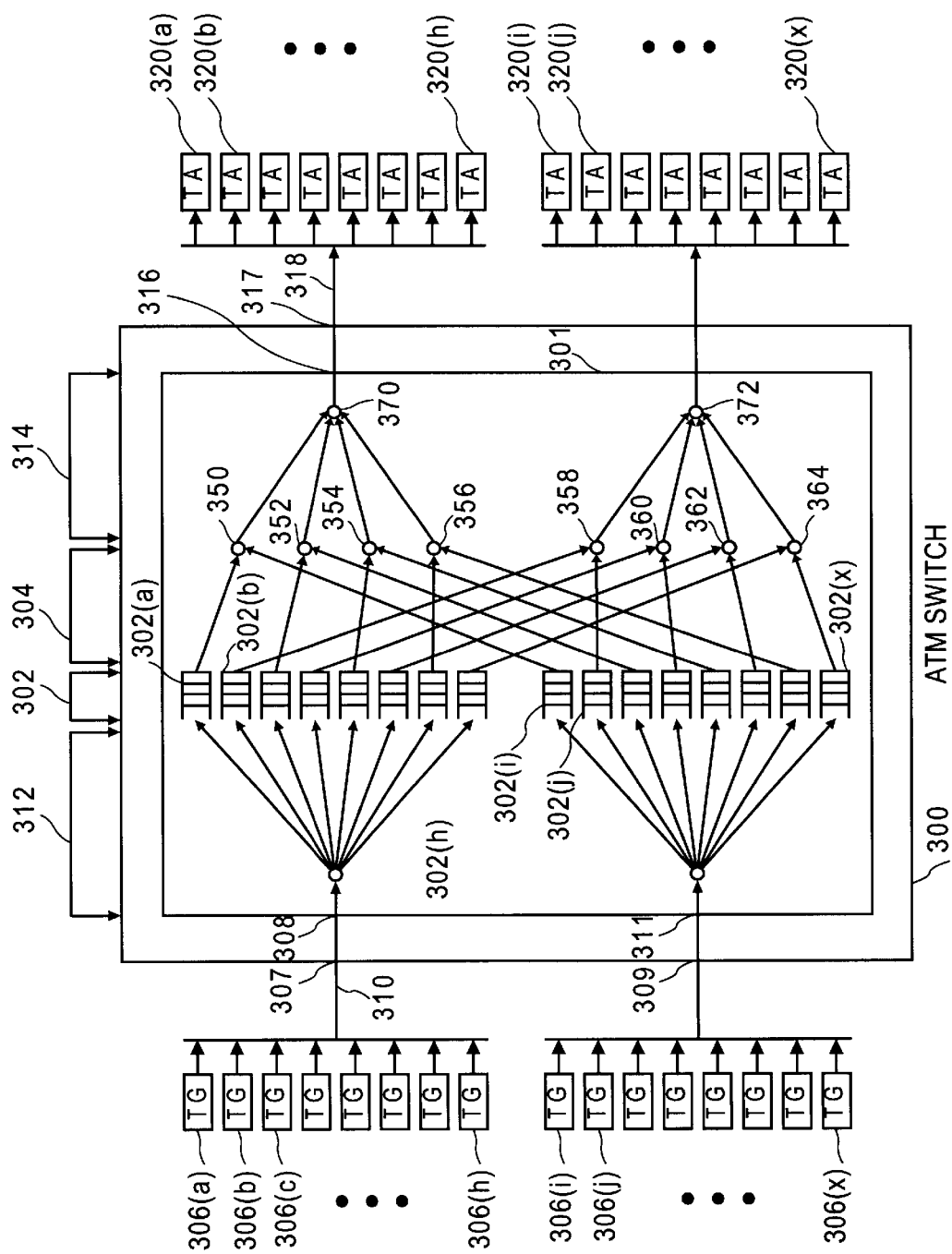
FIG. 3 illustrates, in accordance with one embodiment of the present invention, an inventive ATM switch which offers per virtual connection buffering.

To further discuss the features and advantages of the present invention, FIG. 3 illustrates, in accordance with one embodiment of the present invention, an inventive ATM switch 300, including inventive switch element 301 having a buffer portion 302 and a switch matrix portion 304. Switch element 301 is coupled to a plurality of traffic generators TG 306(a)–TG 306(x). Traffic generators TG 306(a)–TG 306(h) couple to ATM switch 300 via an ATM input port 307, and traffic generators TG 306(i)–TG 306(x) couple to ATM switch 300 via an ATM input port 309. Each traffic generator, e.g., TG 306(a) or TG 306 (b), represents an ATM cell source, which may include one or more communication devices generating the ATM cells to be input into switch element 301 for switching. For ease of discussion, only devices and structures connected to ATM port 307 of FIG. 3 (and subsequent FIGS. 4 and 5) will be discussed in detail. Devices and structures coupled to lower ATM port 309 operate in a similar manner and are generally omitted from the discussion for brevity sake.

A traffic generator typically has a corresponding buffer structure within buffer portion 302 of switch element 301 to buffer the incoming ATM cells. For example, buffer structure 302(a) is provided to buffer ATM cells from traffic generator TG 306(a), buffer structure 302(b) is provided to buffer ATM cells from traffic generator TG 306(b), and so on. When data buffering is associated with the virtual data connection between a traffic generator and a destination, such data buffering is referred to herein as per-virtual connection or per-VC buffering. The connection is virtual since it does not represent a tangible, physical connection but is instead a data connection between two defined devices, with multiple connections capable of sharing a single ATM port. This data buffering technique is different from prior art approaches wherein data buffering is typically associated with an ATM input (or output) port irrespective of the number of traffic generators coupled to that port.

A buffer structure may be implemented as a dedicated queue in hardware or as a memory construct in digital memory. When implemented as a memory construct, the buffer structure may be made dynamic, e.g., as a linked list or a double linked list in random access memory, and implementation costs is advantageously reduced thereby since a large number of buffer structures may be inexpensively implemented in this manner.

As is typically the case, multiple traffic generators may be coupled together and communicate with ATM switch 300 via a common link. FIG. 3 shows traffic generators TG 306(a)–TG 306(h) being coupled to ATM input port 309 via a link 310. Link 310 may represent any data link, e.g., copper wires, fiber optics, a physical medium for wireless transmission, a common bus, and is preferably a 622 Megabits per second (Mbps) link in one embodiment.

Input routing portion 312 distributes traffic from traffic generators 316(a)–316 (h) to respective buffer structures 302(a)–302(h). From buffer structures 302(a)–302(h), ATM cells are switched via switch matrix portion 304 and an output arbitrating portion 314 to its appropriate output destinations via switch matrix output port 316 of switch element 301 and link 318. Arbitrating portion 314 represents the circuitry for arbitrating access to link 318 and may be implemented in any conventional manner. The destinations are shown in FIG. 3 as traffic acceptors TA 320(a)–TA 320(x), representing communication devices that receive the ATM cells from traffic generators TG 306(a)–TG 306(x) via switch element 301.

Any traffic generator may be coupled with any traffic acceptor via switch element 301. When a traffic generator and a traffic acceptor are switched via switch element 301, a connection is made. A connection is distinguished from a path since a path couples an ATM input port to an ATM output port and may include many different connections. For ease of understanding, a path may be analogized to a freeway. The lanes on the freeway represent connections. Cars move in lanes and analogously, ATM cells are switched along a connection.

As can be seen from FIG. 3, the present invention permits input data buffering to be performed on a per-VC basis within switch element 301. As mentioned earlier, this is different from prior art ATM switch implementations wherein data buffering is performed only on a per-port basis. The per-VC buffering technique advantageously minimizes head-of-the-line blocking since ATM cells associated with different connections, i.e., destined for different traffic acceptors, are not buffered by the same buffer structure. When ATM cells are buffered, they are all associated with the same connection, i.e., destined for the same traffic acceptor, and no head-of-the-line blocking exists.

To employ the analogy above, a car A going to a destination A will be in lane A, and a car B going to a destination B will be in lane B. Traffic slowdowns (buffering) occur one a lane-by-lane basis (connection-by-connection) in accordance with the inventive per-VC buffering technique. Accordingly, car A going to destination A will not be impeded if car B is stalled.

In contrast, the prior art buffers on a per-port basis. Using the same analogy, both car A and car B are channeled through a bottleneck (per-port buffer) in the prior art. If car B is stalled in the bottleneck (buffered in the per-port buffer), car A will be held up in the buffer if it is behind car B although the destination of car A is entirely different from the destination of car B.

Per-VC buffering may be accomplished using any conventional memory technology, e.g., on memory chips or in some other types of physical memory devices such as magnetic, optical, or laser devices. In accordance with one aspect of the present invention, per-VC buffering is preferably implemented within switch element 301. Further, the use of semiconductor memory to implement buffer structures 302(a)–302(h) makes it possible to place a large number of buffers structures on the same chip as the switch matrix, thereby enabling ATM switch 300 to be offered in relatively few chips.

In one embodiment, output arbitrating portion 314 includes schedulers 350, 352, 354, 356, 358, 360, 362, and 362 as well as selectors 370 and 372 for arbitrating access for connections from switch matrix portion 304 to link 318 for output. In accordance with one aspect of the present invention, arbitration is performed on a per-VC basis, with a scheduler being coupled to connections having the same priority for switching. A connection may have a higher priority for switching if it contains information that is more time-sensitive than a connection having a lower priority for switching. By way of example, a connection carrying a telephone conversation typically has a higher priority than a connection carrying electronic mail. If the former connection is delayed, the telephone conversation becomes garbled. If the latter connection is delayed, there is little, if any, consequence.

With reference to FIG. 3, scheduler 350 is coupled to both buffer structure 302(a) and buffer structure 302(i), which have the same priority. Likewise, scheduler 352 is coupled to both buffer structure 302(b) and buffer structure 302(j), which have the same priority. Of course, each scheduler may be coupled to as many buffer structures as needed, and there is no requirement that two schedulers must be coupled to the same number of buffer structures. The schedulers then select cells from the connections (buffer structures) with which it is coupled in accordance to some preselected schedule.

In one embodiment, a scheduler selects ATM cells among the connections with which it is coupled using a round-robin selection technique (with each connection being selected in turn), a weighted round-robin technique, or with other conventional selection techniques that ensure appropriate selection for the nature of the information carried on the multiple connections. For example, scheduler 350 may select in a round robin manner between ATM cells from buffer structure 302(a) and buffer structure 302(i).

With respect to weighted round-robin, there may be, for example, 6 VC's: A, B, C, D, E, and F. Each VC may be assigned a different weight, e.g., a weight of 2 for each of A, B, and C, and a weight of 1 for each of D, E, and F. Then the scheduler may output the following pattern, for example, A, A/D/B, B/E/C, C/F and so on. On the other hand, this implementation, while being adequate for some switches, gives rise to bursts of data from VC's A, B, and C.

In another embodiment, the inventive modified weighted round robin (MWRR) may interleave the VC's with the same weight and produce an output pattern of A, B/D C, A/E/B, C,/F and so on. This is accomplished by, for example, assigning VC's with the same weight in a queue of queues (e.g., virtual connections A, B, and C in a first queue of weight 2, and virtual connections D, E, and F in a second queue of weight 1) and implementing weighted round-robin among these queues of queues.

There is provided a selector for every ATM output port. For example, FIG. 3 shows a selector 370 associated with ATM output port 317. A selector is coupled to all schedulers associated with connections going to its ATM output port and selects ATM cells among schedulers using a preselected criteria. For example, selector 370 may select ATM cells from schedulers 350, 352, 354, and 356 using a round-robin technique, a weighted round-robin technique, or on a pure priority basis (since each scheduler may be associated with a given data switching priority). Together schedulers and selectors are arranged such that selection among the various ATM sources are performed in a manner that is appropriate in view of the respective switching priorities and fairness among connections. It will be appreciated that the actual technique selected for each scheduler and selector in ATM switch 300 may vary depending on the nature of the information carried and other considerations specific to user preference.

Figure 4:
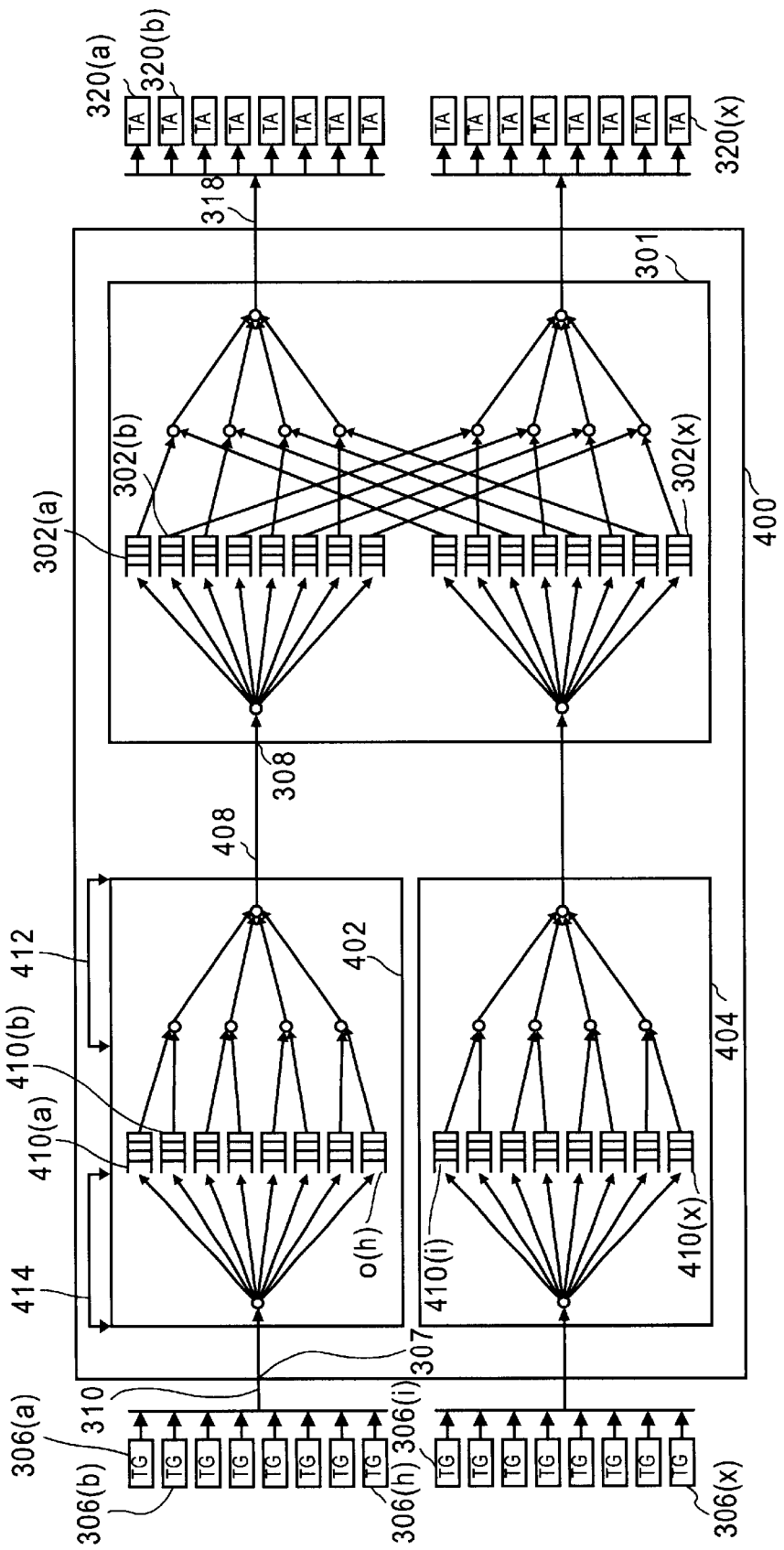
FIG. 4 illustrates, in accordance with one embodiment of the present invention, an inventive ATM switch which offers per-virtual connection buffering and per-virtual connection back-pressure.
Figure 5:
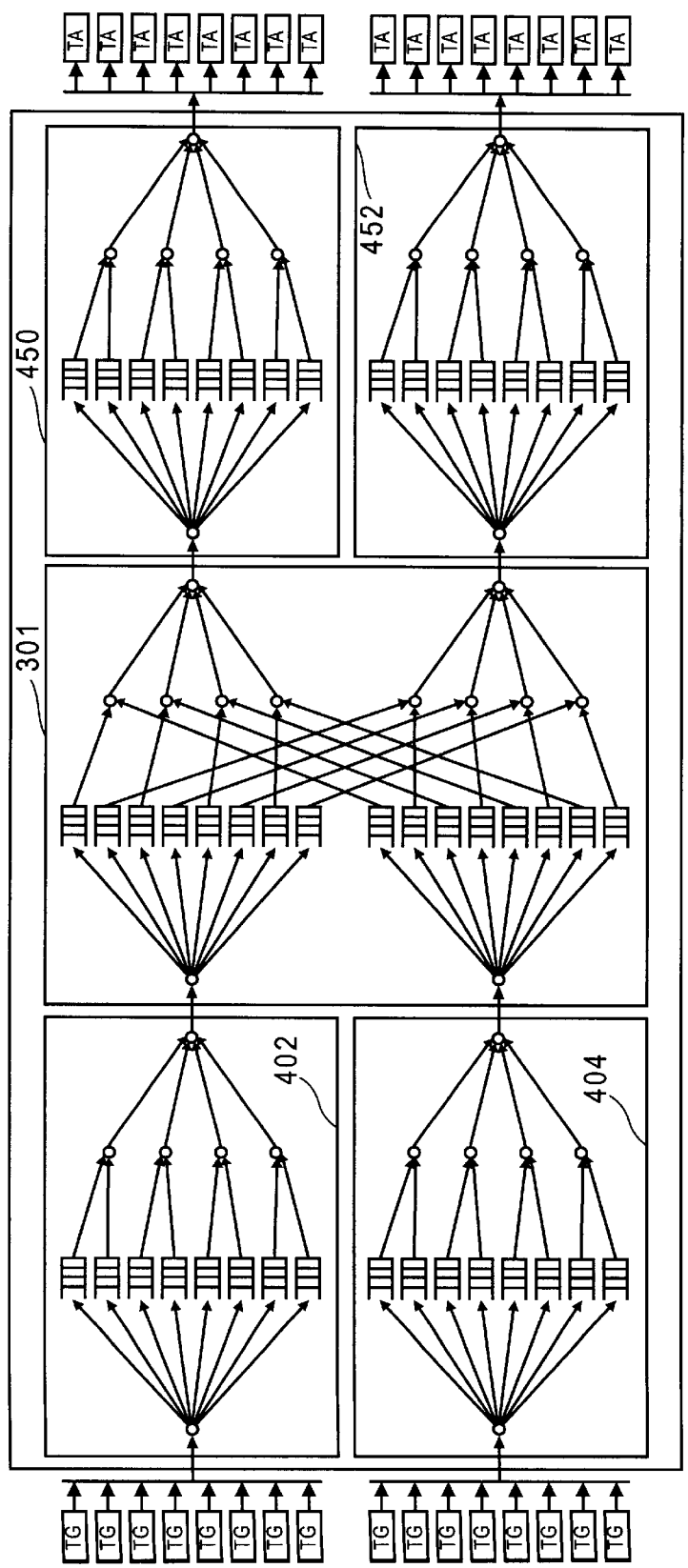
FIG. 5 illustrates the ATM switch of FIG. 4, including output SAP's for performing per-virtual connection output buffering.

To further improve buffering capability, and more importantly to provide for improved condition management on a connection-by-connection basis, there are provided, in accordance with one embodiment of the present invention, structures for allowing back-pressuring to be accomplished on a per-VC basis. In one embodiment, per-VC back-pressuring is accomplished via the provision of switch access port (SAP) structures, which include another plurality of buffering structures for buffering the incoming ATM cells if the buffer structures 302(a)–(x) in switch element 301 are filled. With reference to FIG. 4, there is shown an ATM switch 400, which includes switch element 301 of FIG. 3 and incoming SAP structures 402 and 404. For ease of discussion, only SAP structure 402 is discussed in detail since SAP structure 404 is an analogous structure whose operation will be apparent to those skilled in the art given this disclosure.

Incoming SAP structure 402 is coupled to switch matrix input port 308 of switch element 301 via a link 408, which may represent for example a fiber optic link, a wireless link, or a conducting link. Incoming SAP structure 402 is further coupled to link 310 through input port 307 of ATM switch 400. Link 310, as discussed earlier in connection with FIG. 3, couples with a plurality of traffic generators TG 306(a)–TG 306(h).

Within SAP structure 402, there are shown a plurality of buffer structures 410(a)–410(q), each of which corresponds to a respective one of buffer structures 302(a)–302(q) of switch element 301. There are also shown an input routing portion 414 representing the circuitry for routing data from link 310 to buffer structures 410(a)–410(h), and an input arbitrating portion 412 representing the circuitry for arbitrating access from buffer structures 410(a)–410(h) to link 408. In one embodiment, input arbitrating portion 412 may be omitted and individual ones of buffer structures 410(a)–(q) may be directly coupled with corresponding ones of buffer structures 302(a)–(q). More typically, the outputs from buffer structures 410(a)–(q) are aggregated using input arbitrating portion 412 within SAP 402 prior to being output onto common high-speed link 408 for transmission to switch matrix input port 308 of switch element 301. Input arbitrating portion 412 may be implemented in a manner similar to output arbitrating portion 314 of FIG. 3, i.e., via schedulers and selectors, or in any conventional manner so as to ensure fair and appropriate selection of ATM cells in view of the respective priorities of the input data and other user preferences.

In accordance with one aspect of the present invention, ATM cells corresponding to a connection are buffered at one of buffer structures 302(a)–(x) first. When that buffer structure (one of buffer structures 302(a)–(x)) is filled, the connection is then back-pressured from switch matrix 301, and the excess ATM cells are then stored in a corresponding one of buffer structures 410(a)–(x). By way of example, ATM cells corresponding to the connection from traffic generator 306(a) is first buffered in buffer structure 302(a) within switch element 301. If buffer structure 302(a) becomes full buffer 410(a) is then employed to store the excess ATM cells.

In this manner, back-pressuring is also performed on a per-VC basis (in addition to the per-VC buffering provided by the buffer structures within switch element 301). The presence of an additional buffer structure in the virtual connection allows the connection to absorb bursts of data in a more efficient manner (through per-VC buffering at the central switch and then through per-VC back pressuring). It should be apparent to those skilled that the buffers herein may be implemented with low bandwidth buffers, which lower implementation cost.

Further, the ability to control the buffer size and/or usage on a per-VC basis advantageously permits the overall shared buffer space to be utilized more efficiently. For example, the threshold associated with individual connections (the threshold determines the maximum buffer size for a given connection) may be individually set such that overall buffer utilization may be optimized.

In one embodiment, the shared buffer space in the central switch 301 may be optimized by specifying the threshold window for each virtual connection. By way of example, the threshold may be specified with two values: a minimum value and a maximum value. If the number of cells buffered falls below the minimum value, the back pressure is removed, thereby allowing the input port to start sending cells again to the central switch. Conversely, if the number of cells buffered exceeds the maximum value, back-pressure is enabled. As can be appreciated from the foregoing, the provision of the threshold window advantageously reduces the back pressure traffic associated with each connection.

Additionally, the buffer threshold may be set for groups of VC's. By way of example, a threshold or a threshold window may be set for a group of VC's having the same priority. If the number of cells buffered for that group exceeds the maximum threshold, back pressuring may commence. The same concept may of course apply for VC's grouped on another basis.

The provision of additional buffer structures within SAP structure 402 improves throughput of ATM cells since the additional buffer structures represent a mechanism for absorbing bursts of data from the traffic generators. In the past, when a connection is no longer able to handle the amount of ATM cells output by a traffic generator, an instruction is generated to instruct that traffic generator to slow down until traffic on that connection improves. In the present invention, that traffic generator may continue to send out data at full speed and the excess data, when the buffer structure in switch element 301 that corresponds to that connection is filled, is buffered by a corresponding buffer element in SAP structure 402.

Most importantly, this back pressure mechanism operates on a per-VC basis. As a consequence, heavy traffic on one connection will not impede traffic on another connection that may be sharing the same ATM port. This is unlike the prior art architecture of FIG. 2C wherein back-pressure is done on a per-port basis. When back-pressure is necessitated in the prior art, the possibility of head-of-the-line blocking is present since ATM cells going to different destinations may be held up in the same buffer structure during back-pressure.

Furthermore, the per-VC buffering and per-VC back pressuring features offered by the inventive switch architecture further permit condition management to be performed on a connection-by-connection basis. In other words, it is possible to control the throughput rate of an individual ATM connection through ATM switch 400 (or ATM switch 300 of FIG. 3)without substantially impacting the throughput rate of another individual ATM connection. For example, by allowing a connection to have a larger back pressure buffer space, e.g., buffer 410(a), that connection may be able to handle larger bursts of data.

Link 318 of ATM switch 400 (as well as of ATM switch 300) may be directly coupled to the output port of the ATM switch. Alternatively, in the embodiment of FIG. 5, output buffering on data out of switch element 301 may be provided on a per-VC basis using an output SAP's 450 and 452 (switch access port), which are similar in structure and function to SAP 402 of FIG. 4. When per-VC output buffering is provided in addition to the per-VC back-pressuring and per-VC input buffering (as shown in FIG. 4), each connection may advantageously be controlled on both the input side and the output side (relative to switch element 301). By way of example, it is possible to offer traffic shaping on a per-VC basis using the buffer structure at the output SAP to control the amount of ATM cells that traverse each connection. By individually controlling or shaping the traffic on each connection, the overall traffic through the ATM switch may be optimized for a given network.

Figure 6:
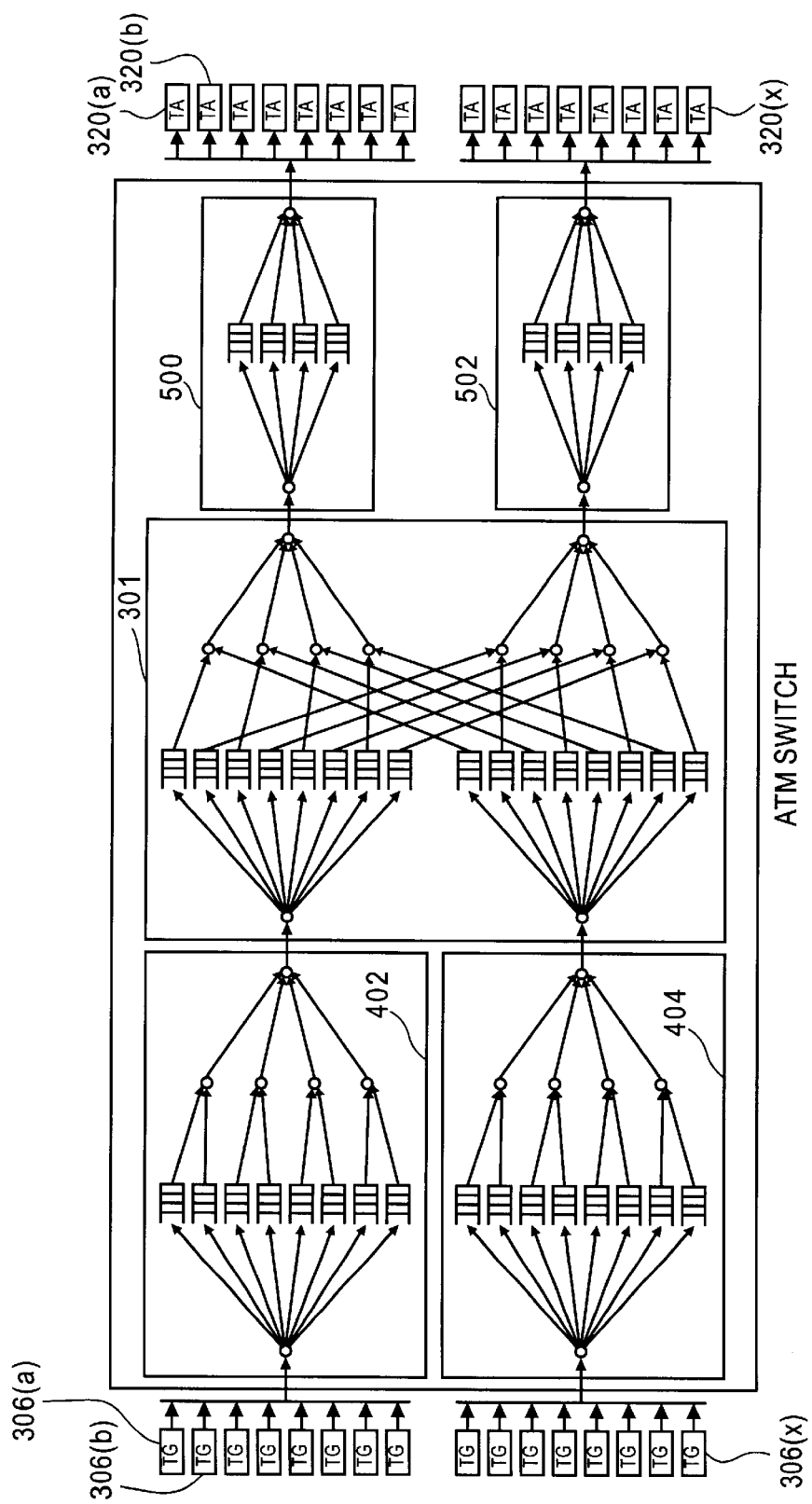
FIG. 6 illustrates the ATM switch of FIG. 4, including simplified output SAP's for performing output buffering.

In another embodiment, a simplified output SAP may be provided. FIG. 6 shows an example of simplified output SAP's 500 and 502 being employed for buffering ATM cells output by switch element 301 prior to being output to traffic acceptors 320(a)–320(h). Within output SAP 500, for example, there are shown buffer structures 504, 506, 508, and 510 for buffering ATM cells output via schedulers 350, 352, 354, and 356.

It is possible, in some cases, to use a simplified SAP with smaller and/or fewer buffer structures because if traffic shaping is not necessary for a network, e.g., for some LAN's, the output SAP is required to only match the output rate of switch 301 with the rate of the ATM output port. Consequently, smaller and/or fewer buffers may be employed in such simplified SAP's. As can be appreciated by those skilled in the art, the ability to employ smaller and/or fewer buffer structures in output SAP's 500 and 502 advantageously reduce implementation cost.

Figure 7:
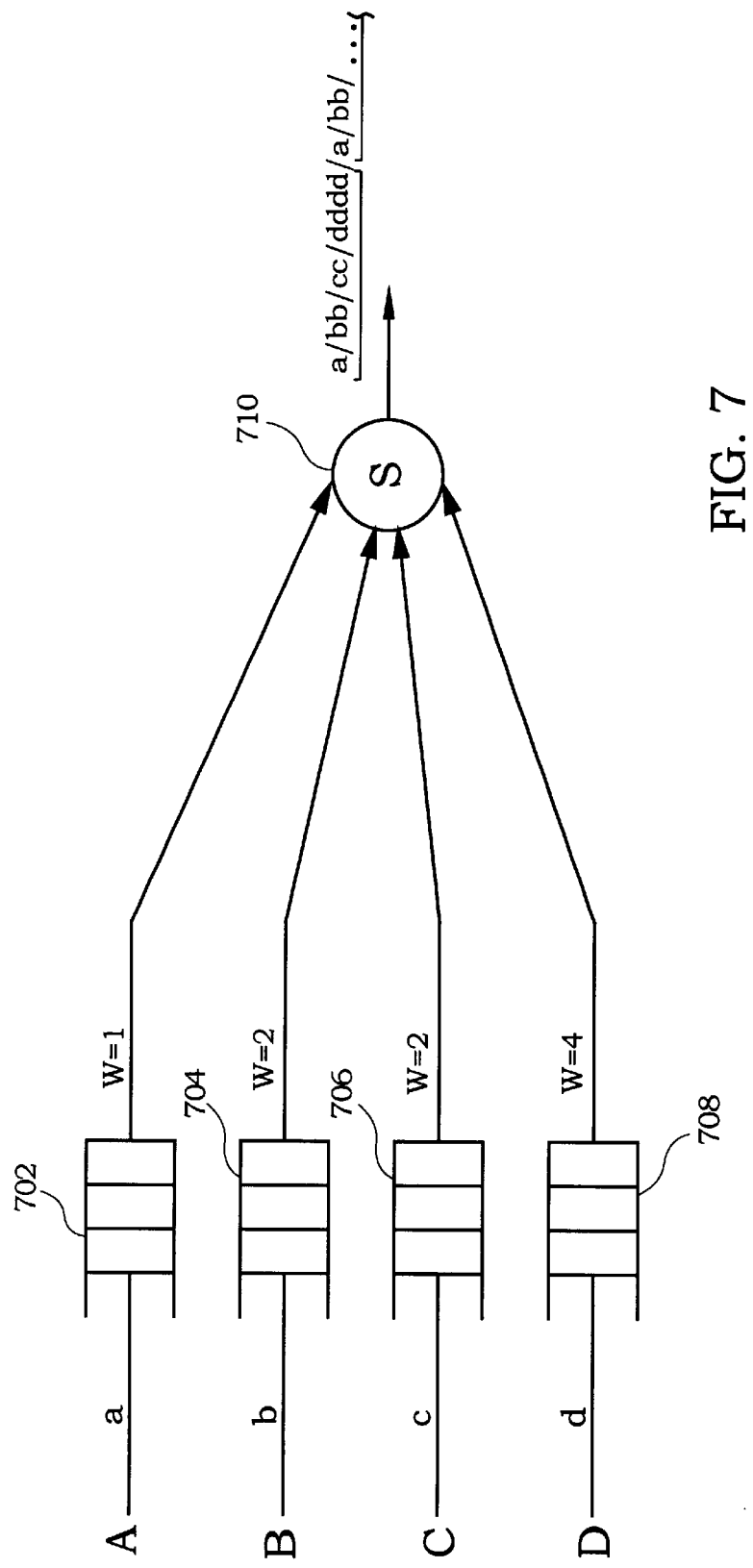
FIG. 7 illustrates four exemplary virtual connections and their respective per-VC queues to facilitate discussion of the cell burstiness problem.

As discussed earlier, in connection with FIG. 3, prior art weighted round robin technique for scheduling ATM cells from may result in data bursts being outputted from the scheduler, i.e., multiple consecutive ATM cells from the same virtual connection or the same port. To facilitate discussion, FIG. 7 illustrates four exemplary virtual connections (VCs) A, B, C, and D, which are coupled to respective per-VC queues 702, 704, 706, and 708. Each of per-VC queues 702, 704, 706, and 708 buffers ATM cells from the traffic generator associated with the virtual connection to improve the efficiency of cell switching. Per-VC queues 702, 704, 706, and 708 are coupled to a scheduler 710, which schedules ATM cells from each of VCs A, B, C, and D for output.

For ease of understanding, the following discussion is made with reference to per-VC scheduling. In other words, scheduler 710 is employed to schedule ATM cells on a per-VC basis, e.g., from virtual connections associated with traffic generators and traffic acceptors in the present example. It should be borne in mind, however, that scheduler 710 may also be employed to schedule ATM cells on a per-port basis, e.g., from paths among the input ports and output ports of the ATM switch. Further, it is contemplated that the scheduler may be employed to schedule cells on a per traffic class, per priority, per group of VCs, or cells similarly grouped. Consequently, the discussion of the inventive modified weighted round robin (MWRR) scheduling technique with reference to per-VC scheduling is made to simplify the illustration and is not intended to be limiting in any way. It should be apparent to those skilled in the art, given this disclosure, that the inventive modified weighted round-robin (MWRR) scheduling technique may be adapted, using ordinary skills, to systems, e.g., ATM, Ethernet, or the like, wherein schedulers perform scheduling on a per-port basis or wherein schedulers perform scheduling on both a per-port basis and a per-VC basis.

Assume for the purpose of discussion that each of VCs B and C requires twice the data transmission rate of VC A. Further assume that VC D requires four times the data transmission rate of VC A. In accordance with prior art weighted round-robin scheduling technique, VC A is accorded a weight of 1, VCs B and C are accorded weights of 2 each, and VC D is accorded a weight of 4. As scheduler 710 selects from each queue in turn, one cell will be outputted from queue 702, two cells each will be outputted from queues 704 and queue 706, and four cells will be outputted from queue 708. The output pattern is therefore a/bb/cc/dddd (and repeat), where "a", "b", "c", and "d" represent cells from respective virtual connections A, B, C, and D.

Although the prior art weighted round robin scheduling technique outputs the desired number of cells from the scheduler in accordance to the data transmission requirements of the different virtual connections, cells are often outputted in bursts. For example, cells from virtual connection B are outputted in bursts of 2 consecutive cells (e.g., "bb"). Likewise, cells from virtual connection C are outputted in bursts of 2 consecutive cells (e.g., "cc"), while cells from virtual connection D are outputted in bursts of four consecutive cells (e.g., "dddd").

The burstiness of the prior art weighted round-robin technique represents a disadvantage since the number of consecutive cells from a single connection in a burst may temporarily exceed during the burst the ability of a traffic generator to supply the cells and/or the bandwidth allocated to the virtual connection, and/or the ability of the traffic acceptors (i.e., the device in communication with the traffic generating device) to receive the cells. By way of example, cell burstiness may require, in some cases, back-pressuring of the virtual connection. In extreme cases, cell burstiness may overwhelm the ability of the virtual connection to absorb bursts, i.e., fill all the queues of the virtual connection, thereby forcing the traffic generator to discard some of the consecutive cells that cannot be switched.

Figure 8A:
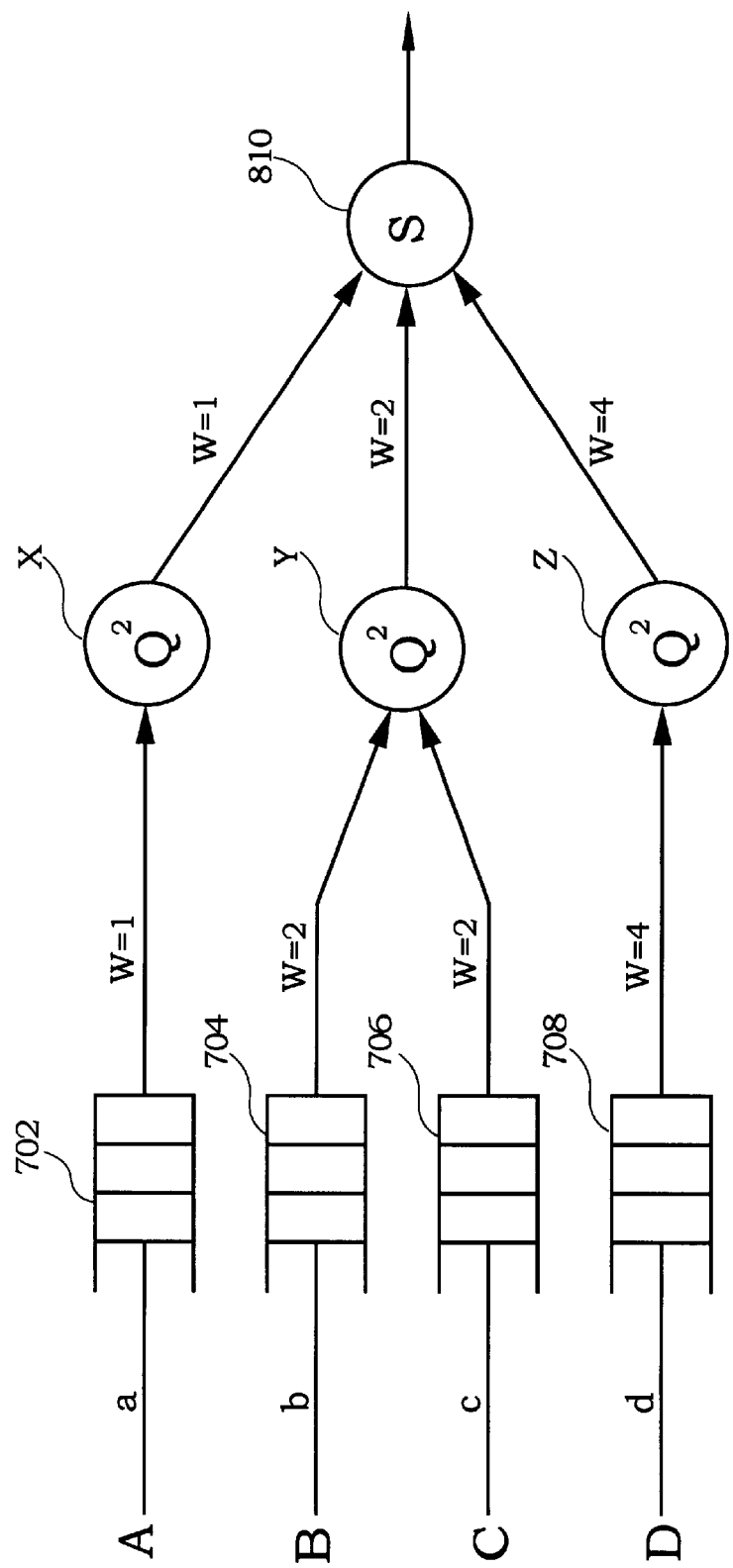
FIG. 8A illustrates one embodiment of the inventive modified weighted round-robin scheduling (MWRR) technique for reducing cell burstiness.

In accordance with one aspect of the present invention, there is provided an inventive modified weighted round-robin (MWRR) scheduling technique wherein cell burstiness is substantially reduced. FIG. 8A illustrates one embodiment of the inventive modified weighted round-robin scheduling (MWRR) technique. In FIG. 8A, each of connections A, B, C, D is first coupled to a structure referred to herein as a queue of queues. A queue of queues acts to schedule, in a round-robin manner, cells from the multiple connections that have the same weight. It will be apparent to those skilled that a queue of queues is substantially similar to a scheduler since they both take cells from their multiple inputs in some round-robin manner.

With reference to FIG. 8A, connections B and C each has a weight of 2. Accordingly, queue of queues Y will alternately output cells from queues 704 and 706 and output them to scheduler 810. Since there is only one connection with a weight of 1, queue of queues X will repeatedly output cells only from queue 702. Likewise, since there is only one connection with a weight of 4, queue of queues Z will repeatedly output cells only from queue 708.

Scheduler 810 then outputs cells from queues of queues X, Y, and Z in accordance with the weights accorded to the connections input into each queue of queues. Accordingly, the weights accorded to queues of queues X, Y, and Z are 1, 2, and 4 respectively.

The scheduling pattern outputted from scheduler 810 is thus x/yy/zzzz (and repeat) where "x", "y", and "z" are cells outputted from queues of queues X, Y, and Z respectively. However, since queue of queues Y alternately outputs cells from queues 704 and 706, the pattern "yy" outputted by queue of queues Y results in cells "bc" being outputted from scheduler 810 (wherein "b" and "c" are cells from connections B and C respectively). The pattern "x" results in a single cell "a" being outputted by scheduler 810 (wherein "a" represents a cell from connection A). The pattern "zzzz" results in cells "dddd" being outputted from scheduler 810 (wherein "d" represents a cell from connection D).

As is apparent from the foregoing, the use of queues of queues to couple together multiple connections that have the same weight, e.g., connections B and C in FIG. 8A, in accordance with one embodiment of the inventive modified weighted round-robin (MWRR) substantially minimizes the cell burstiness associated with these connections. By way of example, the inventive modified weighted round robin scheduling technique discussed in connection with FIG. 8A results in the pattern a/bc/dddd (and repeat) being outputted from scheduler 810. In contrast, the prior art weighted round robin scheduling, as discussed in connection with FIG. 7, puts out the pattern a/bbcc/dddd. However, there is no change in the cell bursts associated with connections that do not have a common weight with any other, e.g., connections A and D.

Figure 8B:
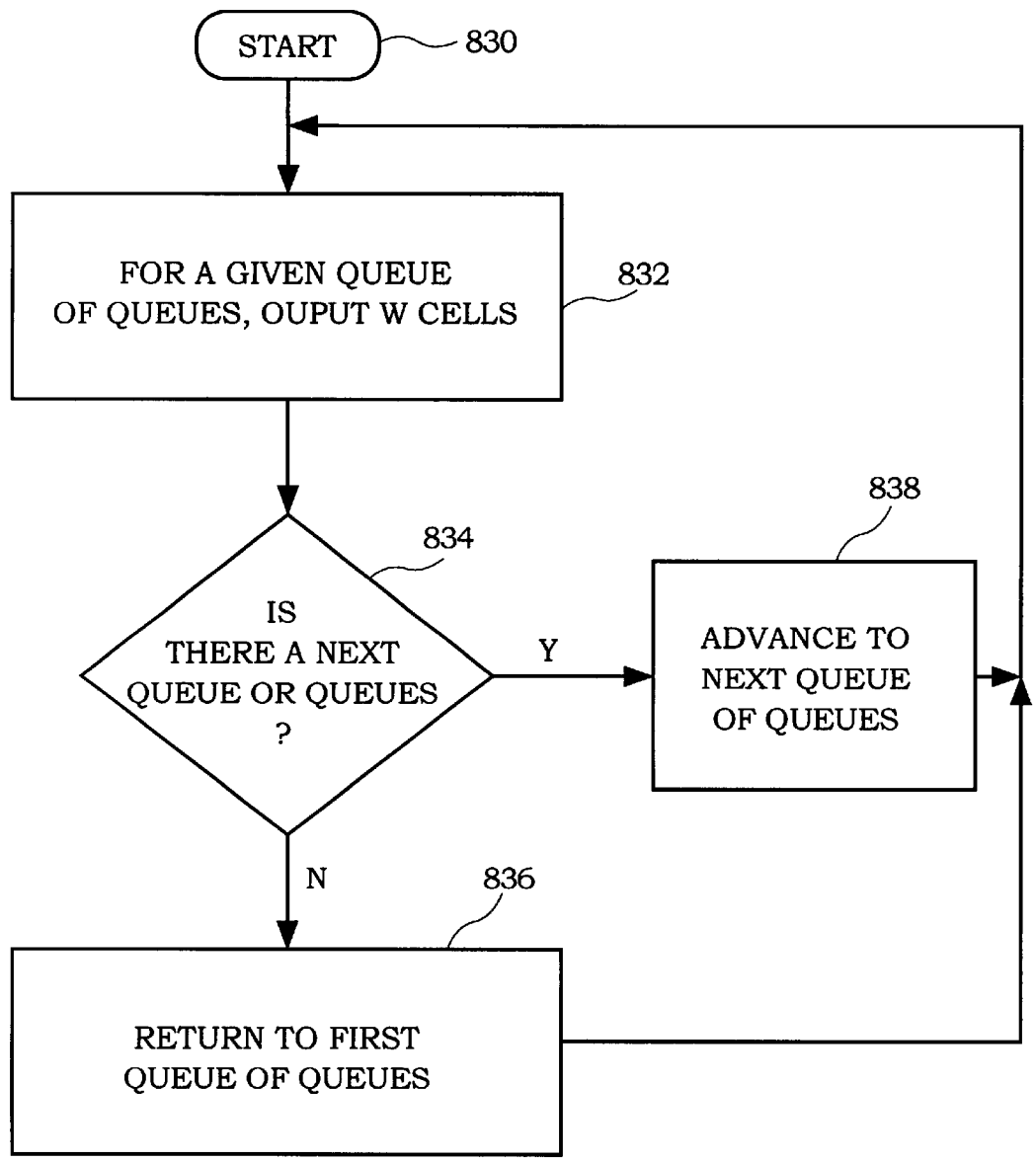
FIGS. 8B and 8C illustrate, in accordance with one embodiment of the present invention, the steps involved in implementing the modified weighted round-robin scheduling (MWRR) discussed in connection with FIG. 8A.
Figure 8C:
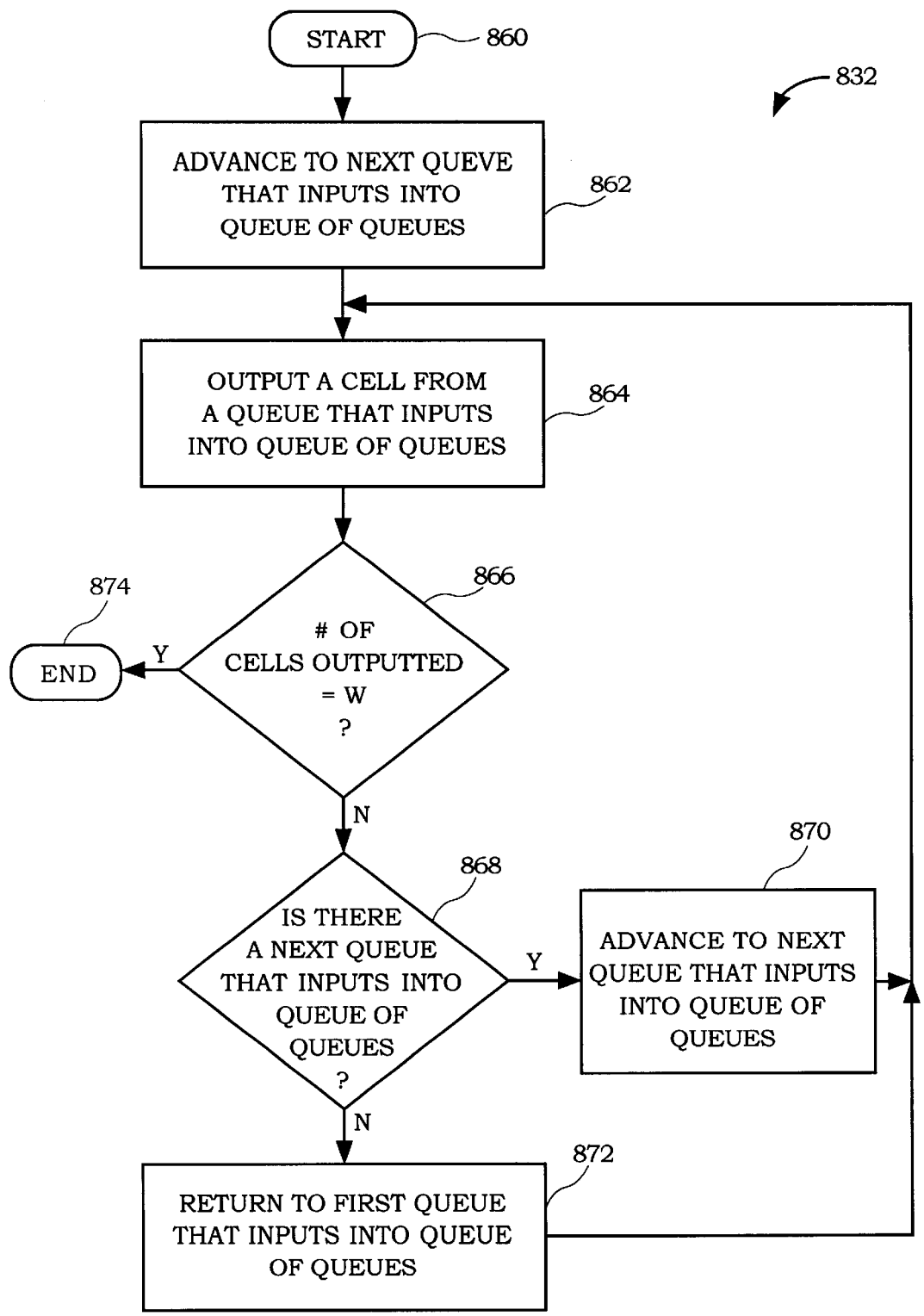

FIGS. 8B and 8C illustrate, in accordance with one embodiment of the present invention, the steps involved in implementing the modified weighted round-robin scheduling (MWRR) discussed in connection with FIG. 8A. It should be borne in mind that FIGS. 8B and 8C are but one approach; it should be apparent to those skilled in the art that other approaches may be employed to programatically implement the modified weighted round-robin scheduling (MWRR) technique discussed in connection with FIG. 8A. In FIG. 8B, the method cycles through the queues of queues. For each queue of queues, the method outputs a number of cell that is equal to the weight assigned to the connection(s) that input into that queue of queues. As mentioned earlier, all connections that have the same weight preferably input into the same queue of queues.

In step 832, the scheduler outputs a number of cell W, that is equal to the weight associated with the connection(s) that input into the queue of queues of the present iteration, e.g., 1 for queue of queues X of FIG. 8A. In step 834, the method ascertains whether there is a next queue of queues to advance to in the next iteration. If not, the method returns to the first queue of queues in step 836 and begins outputting cells again in step 832. If there is a next queue of queues, the method proceeds to that next queue of queues in the next iteration (in step 838) and begins outputting cells again in step 832.

FIG. 8C illustrates in greater detail, in accordance with one embodiment of the present invention, step 832 of FIG. 8B, i.e., the step of outputting cells for the queue of queues of the current iteration. In step 862, the method advances to the next queue that inputs into this queue of queues. If there is only one queue that inputs into the queue of queues of the current iteration (e.g., in the case of queue of queues X or Z), the next queue may be understood to be the one queue that inputs into the current queue of queues or step 862 may be skipped altogether. For the present example, assume that the current queue of queues is queue of queues Y (e.g., there are multiple queues that input into the current queue of queues), the method advances to either queue 704 or queue 706 in step 862 (depending which one is next in the round-robin turn taken by queue of queues Y). In step 864, the method outputs a cell from the queue which it advanced to in step 862. Assuming this queue is queue 704 (see FIG. 8A), the method outputs a "b" cell in step 864.

In step 866, the method ascertains whether the number of cells already outputted from this queue of queues equals the weight assigned to the connection(s) associated with this queue of queues. In the present example, the weight is 2 for queue of queues Y. If not, the method proceeds to step 868 wherein it ascertains whether there is a next queue that inputs into this queue of queues (e.g., either queue 704 or queue 706, whichever is next in the round-robin turn for queue of queues Y). If there is, the method advances to the next queue that inputs into this queue of queues (e.g., queue 706 in the present example) in step 870 and begins outputting a cell from this queue in step 864.

On the other hand, if there is not a next queue (e.g., the case if the current queue is the last queue in the set of queues that inputs into the current queue of queues), the method returns to the first queue that inputs into this queue of queues in step 872. If there is only one queue that inputs into the queue of queues of the current iteration (e.g., in the case of queue of queues X or Z), the first queue may be understood to be the one queue that inputs into the current queue of queues or step 872 may be skipped altogether. Thereafter, the method begins outputting a cell from this next queue in step 864. Finally, if the number of cells outputted from this queue of queues equals the weight assigned to the connection(s) that inputs into the current queue of queues (as ascertained in step 866), the steps of FIG. 8C ends in step 874.

Although the inventive MWRR technique of FIGS. 8B and 8C is able to reduce burstiness, the number of cells outputted by a queue of queues that accept cells from multiple connections having the same weight (e.g., queue of queues Y in FIG. 8A) is reduced relative to the cells outputted by queues of queues which accept cells from a single connection (e.g., queues of queues X and Z in the example of FIG. 8A). By way of example, although two "b" cells and two "c" cells are outputted every 9 cells in the example of FIG. 7, only one "b" cell and one "c" cell are outputted employing the MWRR technique discussed in connection with FIGS. 8B and 8C.

Figure 9A:
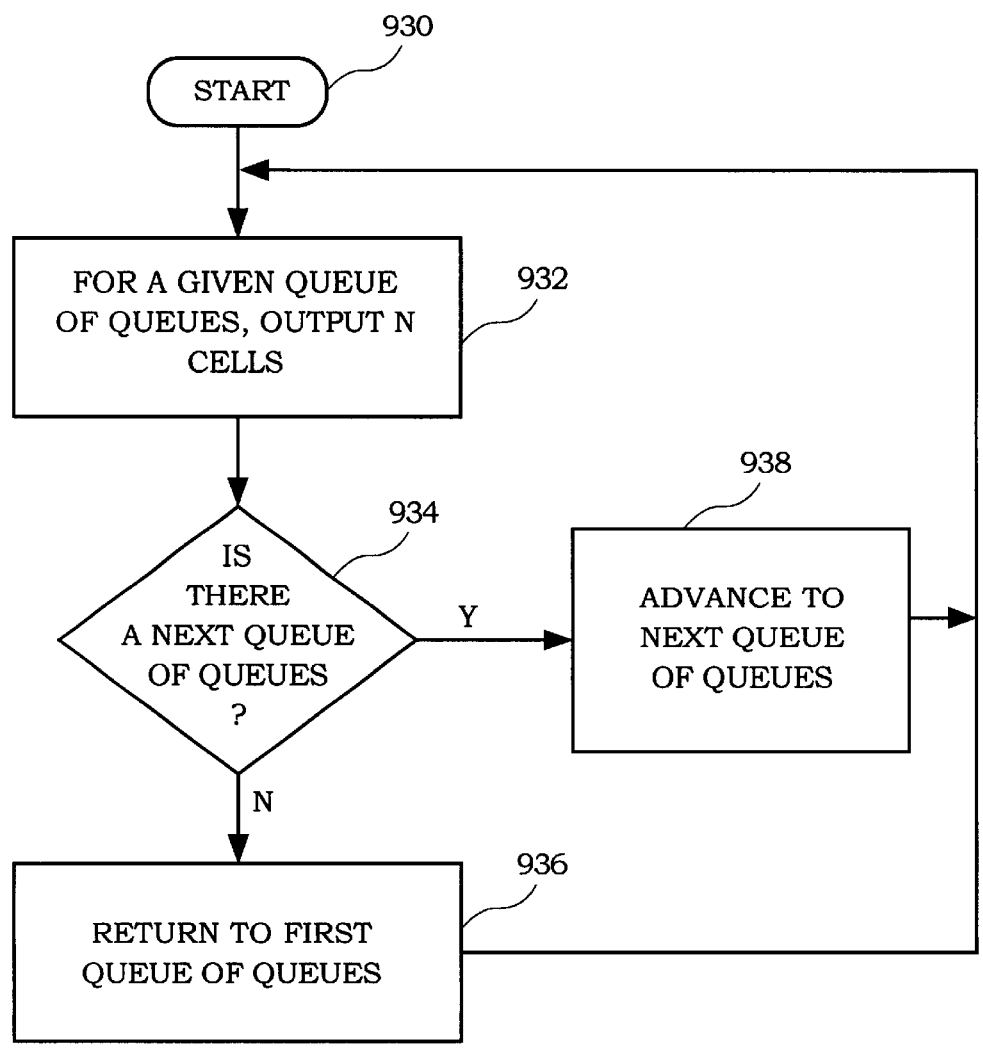
FIGS. 9A and 9B are flowcharts illustrating, in accordance with one aspect of the present invention, the aggregate modified weighted round robin (AMWRR) technique for scheduling cells for output to further reduce cell burstiness.
Figure 9B:
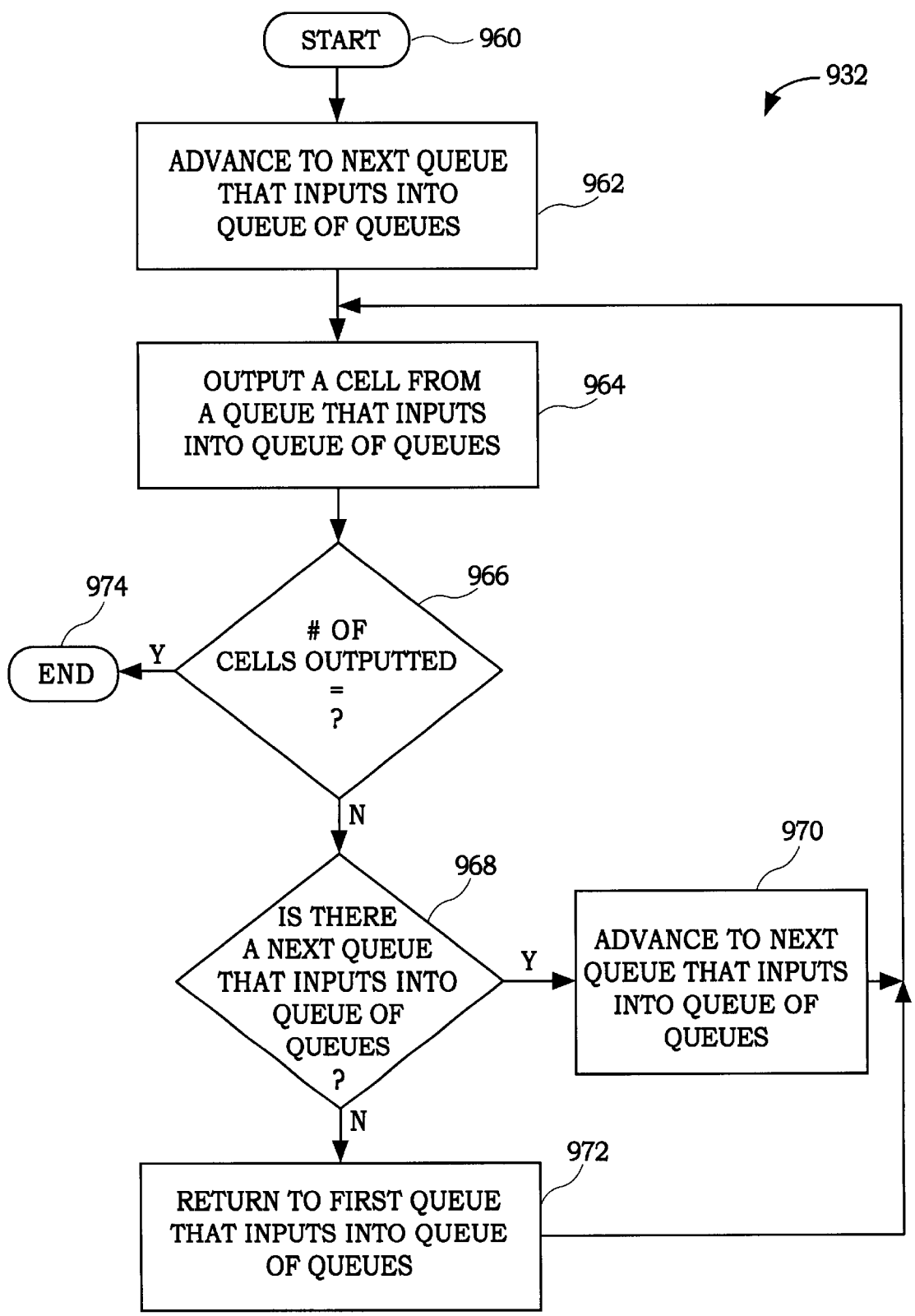

FIGS. 9A and 9B are flowcharts illustrating, in accordance with one aspect of the present invention, the aggregate modified weighted round robin (AMWRR) technique for scheduling cells for output. In accordance with the AMWRR technique, queues of queues that accept cells from multiple connections having the same weight (e.g., queue of queues Y in FIG. 8A) are not penalized with regard to their bandwidth. In contrast with the MWRR technique of FIGS. 8B and 8C in which a queue of queues that accept cells from multiple connections having the same weight (e.g., queue of queues Y in FIG. 8A) only outputs one cell in each turn, the AMWRR technique of FIGS. 9A and 9B outputs n cells (where n=the number of connections that inputs into the queue of queues), in a round robin manner among the multiple connections that input into that queue of queues. With reference to FIG. 8A, the AMWRR technique of FIGS. 9A and 9B will output two cells in a round robin manner, a "b" cell and a "c" cell, for each turn of queue of queues Y.

It should be borne in mind that FIGS. 9A and 9B are but one approach; it should be apparent to those skilled in the art that other approaches may be employed to programatically implement the aggregate modified weighted round-robin scheduling (AMWRR) technique discussed. In FIG. 9A, the method cycles through the queues of queues. For each queue of queues, the method outputs a number of cells, n, that is equal to the number of connections inputted into that queue of queues. As mentioned earlier, all connections that have the same weight preferably input into the same queue of queues.

Figure 1:
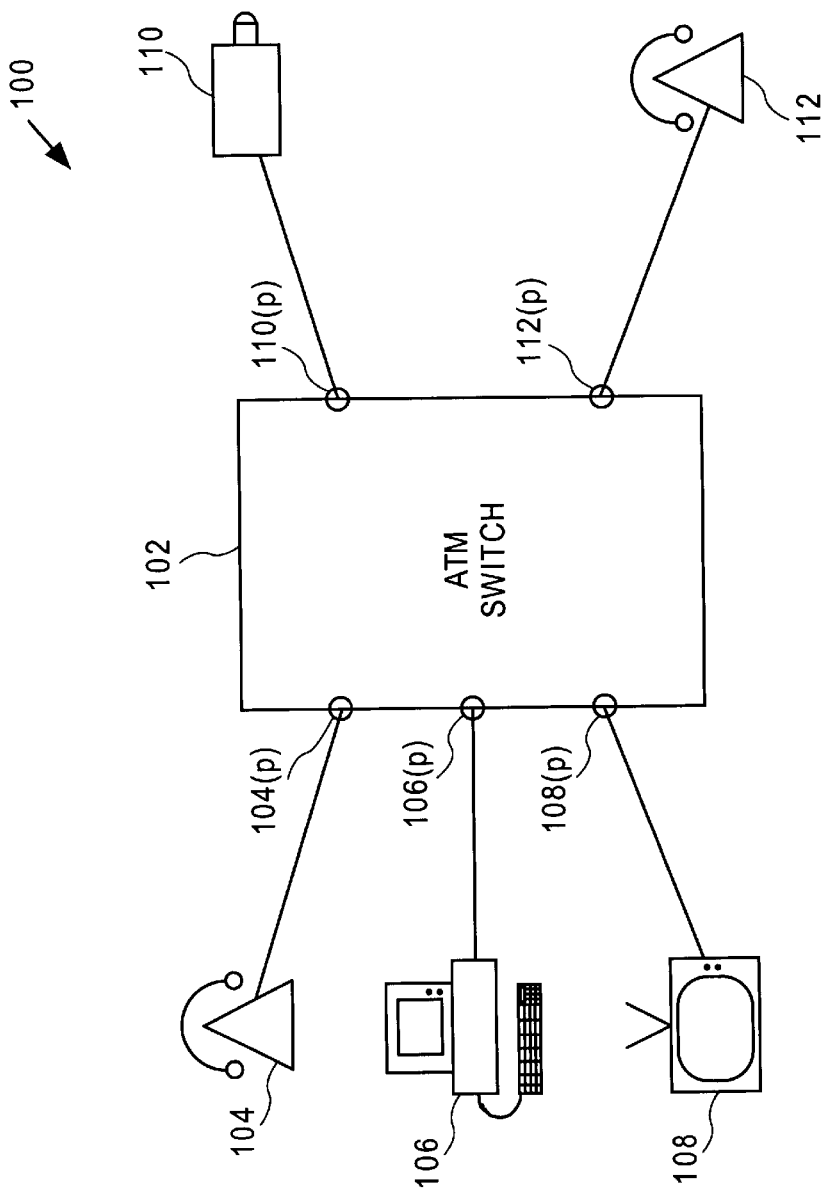
FIG. 1 illustrates a typical data network, including an ATM switch and a plurality of communication devices connected thereto.
Figure 2A:
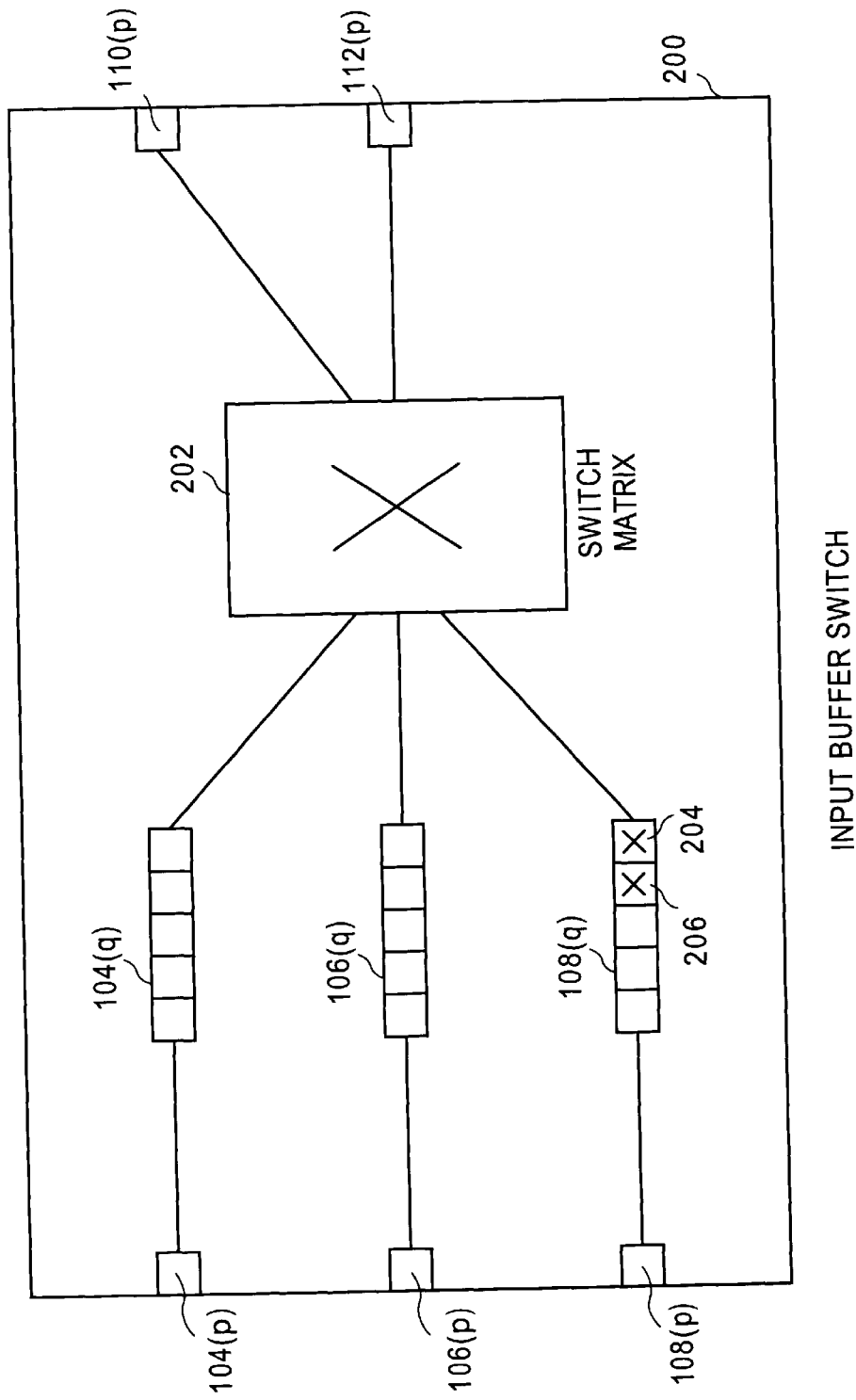
FIG. 2A is a prior art illustration depicting an ATM switch architecture known as an input buffer switch.
Figure 2B:
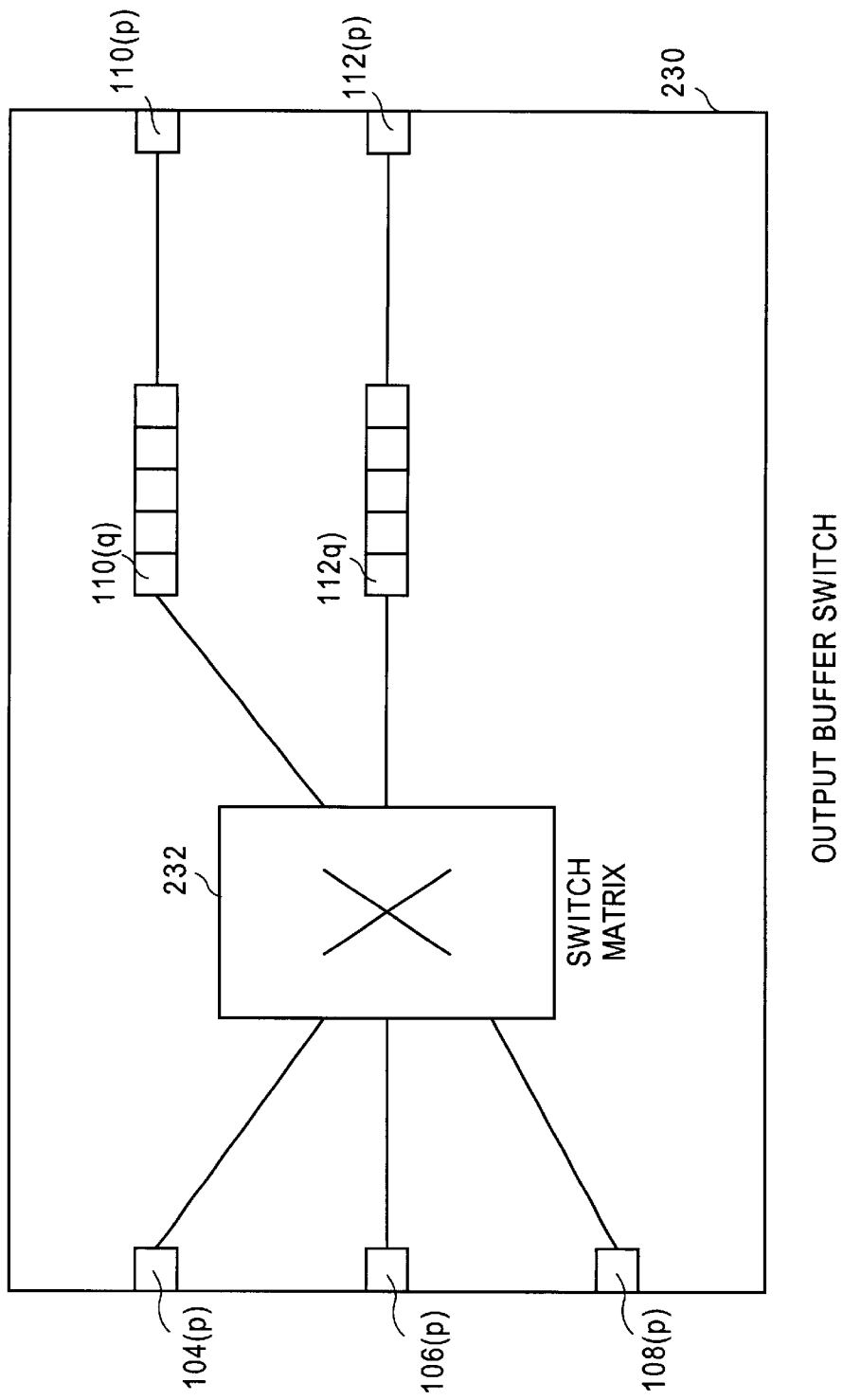
FIG. 2B is a prior art illustration depicting an ATM switch architecture known as an output buffer switch.
Figure 2C:
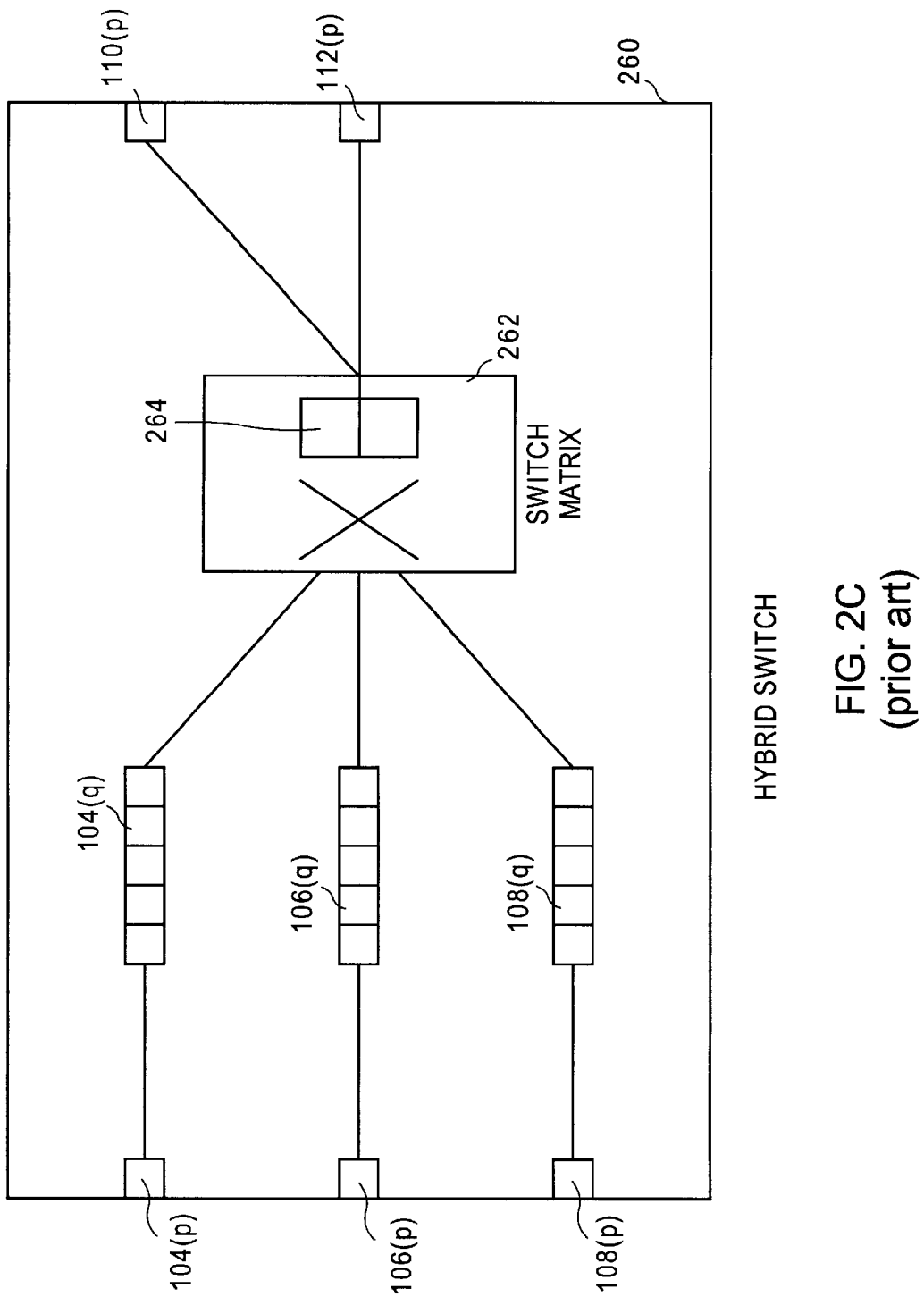
FIG. 2C illustrates a prior art hybrid switch, representing another prior ATM switch architecture which attempts to tradeoff performance and cost.

In step 932, the scheduler outputs a number of cell(s) n, that is equal to the number of connection(s) that input into the queue of queues of the present iteration, e.g., 1 for queue of queues X of FIG. 8A and 2 for queue of queues Y. In step 934, the method ascertains whether there is a next queue of queues to advance to in the next iteration. If not, the method returns to the first queue of queues in step 936 and begins outputting cells again in step 932. If there is a next queue of queues, the method proceeds to that next queue of queues in the next iteration (in step 938) and begins outputting cells again in step 932.

FIG. 9B illustrates in greater detail, in accordance with one embodiment of the present invention, step 932 of FIG. 9A, i.e., the step of outputting cells for the queue of queues of the current iteration. In step 962, the method advances to the next queue that inputs into this queue of queues. If there is only one queue that inputs into the queue of queues of the current iteration (e.g., in the case of queue of queues X or Z), the next queue may be understood to be the one queue that inputs into the current queue of queues or step 962 may be skipped altogether. For the present example, assume that the current queue of queues is queue of queues Y (e.g., there are multiple queues that input into the current queue of queues), the method advances to either queue 704 or queue 706 in step 962 (depending which one is next in the round-robin turn taken by queue of queues Y). In step 964, the method outputs a cell from the queue which it advanced to in step 962. Assuming this queue is queue 704 (see FIG. 8A), the method outputs a "b" cell in step 964.

In step 966, the method ascertains whether the number of cells already outputted from this queue of queues equals the number of connection(s) or queues associated with this queue of queues. In the present example, the number of connections or queues is 2 for queue of queues Y. If not, the method proceeds to step 968 wherein it ascertains whether there is a next queue that inputs into this queue of queues (e.g., either queue 704 or queue 706, whichever is next in the round-robin turn for queue of queues Y). If there is, the method advances to the next queue that inputs into this queue of queues (e.g., queue 706 in the present example) in step 970 and begins outputting a cell from this queue in step 964.

On the other hand, if there is not a next queue (e.g., the case if the current queue is the last queue in the set of queues that inputs into the current queue of queues), the method returns to the first queue that inputs into this queue of queues in step 972. If there is only one queue that inputs into the queue of queues of the current iteration (e.g., in the case of queue of queues X or Z), the first queue may be understood to be the one queue that inputs into the current queue of queues or step 972 may be skipped altogether. Thereafter, the method begins outputting a cell from this next queue in step 964. Finally, if the number of cells outputted from this queue of queues equals the number of connection(s) or queues that inputs into the current queue of queues (as ascertained in step 966), the steps of FIG. 9B ends in step 974.

To further reduce the burstiness, the invention employs, in accordance with one embodiment, dynamic weights to schedule cell output from the scheduler. The concept of dynamic weight is best described in connection with the example of FIG. 10, wherein the weights accorded the queues of queues X, Y, Z of FIG. 8A are employed as static (versus dynamic) weights. For ease of reference, the rows of the table have been labeled as seen on the right hand side of FIG. 10. Likewise, the columns of the table have been labeled as seen at the bottom of FIG. 10.

In accordance with the dynamic weight scheduling technique, scheduler 810 cycles through all its "active" queue of queues. Each time scheduler 810 advances to the next queue of queues, it decrements by 1 the dynamic weight associated with that queue of queues if the dynamic weight is not already zero. If the dynamic weight of a queue of queues is decremented, a cell associated with that queue of queues is outputted by scheduler 810. Scheduler 810 continues to cycle through all "active" queues of queues until all dynamic weights associated with all queues of queues equal to zero, i.e., all queues of queues are "inactive." To clarify, a queue of queues is active when its dynamic weight is greater than zero. Contrarily, a queue of queues is deemed inactive when its dynamic weight is zero. Once all queues of queues input into scheduler 810 are "inactive," their dynamic weights are again set to their static weights and the process begins again from those values.

To illustrate, the static weights of the example of the present embodiment is 1, 2, and 4 for queues of queues X, Y, and Z respectively. In column 1, the dynamic weights of these queues of queues are set to be equal to their static weights, i.e., 1, 2, and 4. In column 2, the dynamic weight associated with queue of queues X is first decremented by 1. Upon decrementing queue of queues X, a cell is outputted from queue of queues X (illustrated by cell "x" in position R4/C2 of the table of FIG. 10).

Scheduler 810 then advances to the next queue of queues, i.e., queue of queues Y, and decrements the dynamic weight associated with queue of queues Y by 1 (see position R2/C3). A cell is outputted from queue of queues Y (illustrated by cell "y" in position R4/C3 of the table of FIG. 10).

Scheduler 810 then advances to the next queue of queues, i.e., queue of queues Z, and decrements the dynamic weight associated with queue of queues Z by 1 (see position R3/C4). A cell is outputted from queue of queues Z (illustrated by cell "z" in position R4/C4 of the table of FIG. 10).

Scheduler 810 then advances to the next queue of queues, i.e., returning to queue of queues X, and attempts to decrement the dynamic weight associated with queue of queues X by 1. However, as shown in position R1/C4), queue of queues X is already inactive, i.e., the dynamic weight associated with queue of queues X is already 0 prior to the decrement attempt. Since it cannot decrement the dynamic weight of an inactive queue of queues, scheduler 810 then advances to the next queue of queues, i.e., queue of queues Y. As shown by the value 1 in position R2/C4, queue of queues Y is still active prior to decrementing. Consequently, the dynamic value associated with queue of queues Y is decremented by 1, to zero in position R2/C5. The successful decrementing of the dynamic value associated with queue of queues Y results in a cell being outputted from this queue of queues (illustrated by cell "y" in position R4/C5).

Scheduler 810 then advances to the next queue of queues, i.e., queue of queues Z, and since this queue of queues is still active (i.e., its dynamic weight is 3 as shown in R3/C5 prior to decrementing), decrements the dynamic weight associated with queue of queues Z by 1 (see position R3/C6). A cell is outputted from queue of queues Z (illustrated by cell "z" in position R4/C6 of the table of FIG. 10).

Scheduler 810 then advances to the next queue of queues, i.e., returning to queue of queues X, and attempts to decrement the dynamic weight associated with queue of queues X by 1. However, as shown in position R1/C6, queue of queues X is already inactive, i.e., the dynamic weight associated with queue of queues X is already 0. Since it cannot decrement the dynamic weight of an inactive queue of queues, scheduler 810 then advances to the next queue of queues, i.e., queue of queues Y.

Scheduler 810 then attempts to decrement the dynamic weight associated with queue of queues Y by 1. However, as shown in position R2/C6, queue of queues Y is already inactive, i.e., the dynamic weight associated with queue of queues Y is already 0. Since it cannot decrement the dynamic weight of an inactive queue of queues, scheduler 810 then advances to the next queue of queues, i.e., queue of queues Z. Since queue of queues Z is still active (i.e., its dynamic weight is 2 prior to decrementing as shown at R3/C6), scheduler 810 decrements the dynamic weight associated with queue of queues Z by 1 (see position R3/C7). A cell is outputted from queue of queues Z (illustrated by cell "z" in position R4/C7 of the table of FIG. 10).

Scheduler 810 then advances to the next queue of queues, i.e., returning to queue of queues X, and attempts to decrement the dynamic weight associated with queue of queues X by 1. However, as shown in position R1/C7, queue of queues X is already inactive, i.e., the dynamic weight associated with queue of queues X is already 0. Since it cannot decrement the dynamic weight of an inactive queue of queues, scheduler 810 then advances to the next queue of queues, i.e., queue of queues Y.

Scheduler 810 then attempts to decrement the dynamic weight associated with queue of queues Y by 1. However, as shown in position R2/C7, queue of queues Y is already inactive, i.e., the dynamic weight associated with queue of queues Y is already 0. Since it cannot decrement the dynamic weight of an inactive queue of queues, scheduler 810 then advances to the next queue of queues, i.e., queue of queues Z. Since queue of queues Z is still active (i.e., its dynamic weight is 1 prior to decrementing as shown at R3/C7), scheduler 810 decrements the dynamic weight associated with queue of queues Z by 1 (see position R3/C8). A cell is outputted from queue of queues Z (illustrated by cell "z" in position R4/C8 of the table of FIG. 10).

Since all queues of queues that input into the scheduler, i.e., queues of queues X, Y, and Z, are inactive, the dynamic weights of these queues of queues are set to be equal to the static weights, i.e., 1, 2, and 4 respectively. In the next iteration in column 9, a cell "x" is outputted in the manner discussed in connection with column 2. In the next iteration in column 10, a cell "y" is outputted in the manner discussed in connection with column 3, and so on.

As can be seen from the foregoing, the pattern outputted is x/y/zy/zzzz (and repeat). Notice that the cell burst "zzzz" seen in connection with the modified weighted round robin scheduling (MWRR) technique of FIG. 8A has been broken up. One of the cell in this group becomes interleaved with the cell from the group "yy." Accordingly, the use of dynamic weight further reduces cell burstiness, particularly with regard to those connections that do not have a common weight with any other (e.g., connection D).

Figure 11:
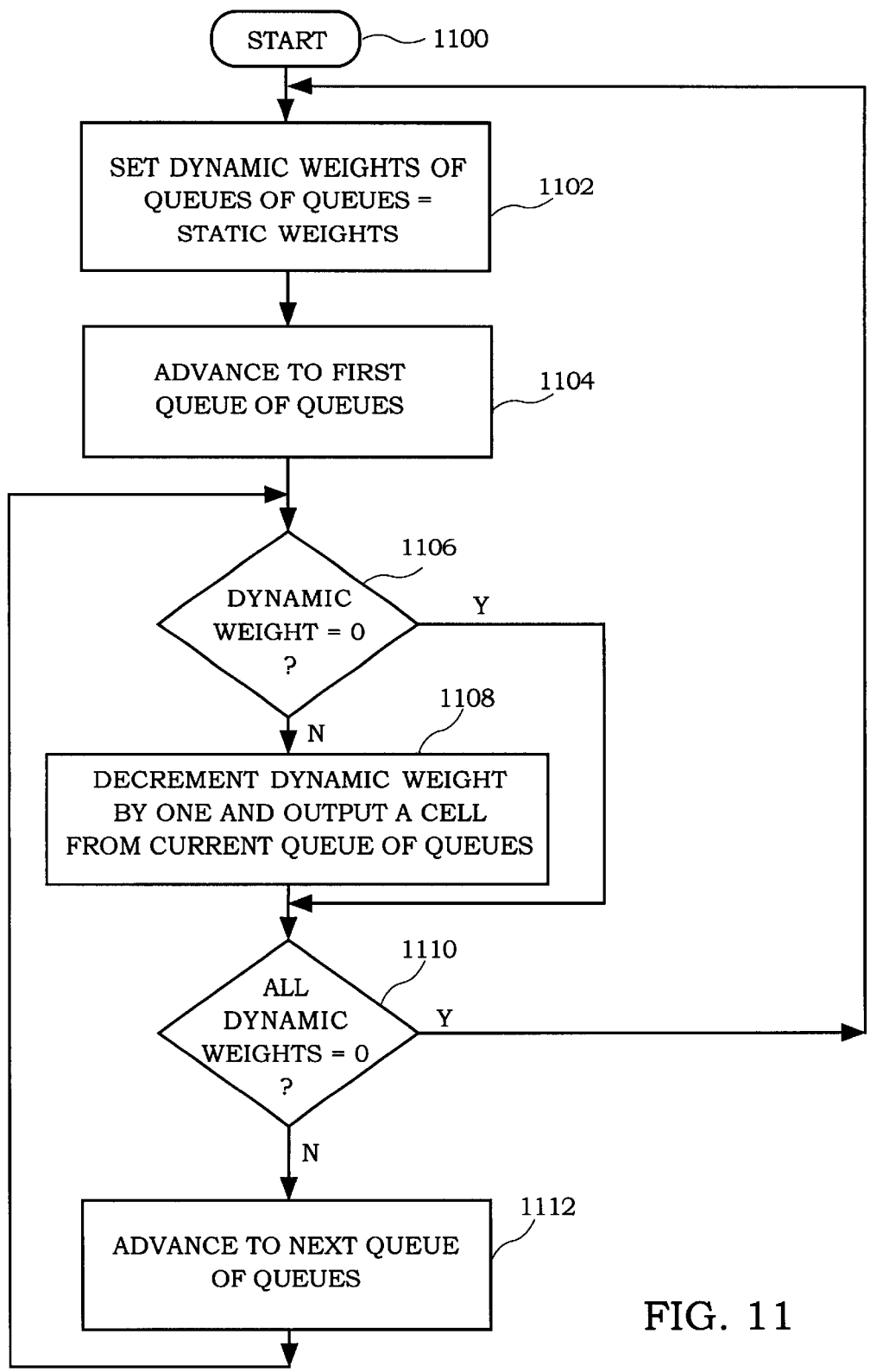
FIG. 11 illustrates, in accordance with one embodiment, the steps involved in implementing the dynamic queue scheduling technique of the present invention.

FIG. 11 illustrates, in accordance with one embodiment, the steps involved in implementing the dynamic queue scheduling technique of the present invention. It should be borne in mind that FIG. 11 is but one approach; it should be apparent to those skilled in the art that other approaches may be employed to programatically implement the dynamic queue scheduling technique discussed in connection with FIG. 10. In step 1102, the dynamic weights of the queues of queues are set to be equal to the static weights assigned to their connection(s). In step 1104, the method proceeds to the first queue of queues, e.g., queue of queues X.

In step 1106, the method ascertains whether the dynamic weight associated with the current queue of queues is zero, i.e., whether the queue of queues of the current iteration is "inactive." If not, the dynamic weight associated with this queue of queues is decremented by 1, and a cell is outputted from the current queue of queues (in step 1108). Thereafter, the method ascertains whether all dynamic weights are zero in step 1110. If not, i.e., if at least one queue of queues is active, the method advances to the next queue of queues in step 1112. On the other hand, if the dynamic weight associated with all queues of queues all equal to zeros, i.e., if all the queues of queues are inactive, the method returns to step 1102 where the dynamic weights of all the queues of queues are set to be equal to their static weights to permit the method to continue cycling through all queues of queues to output cells.

Figure 12:
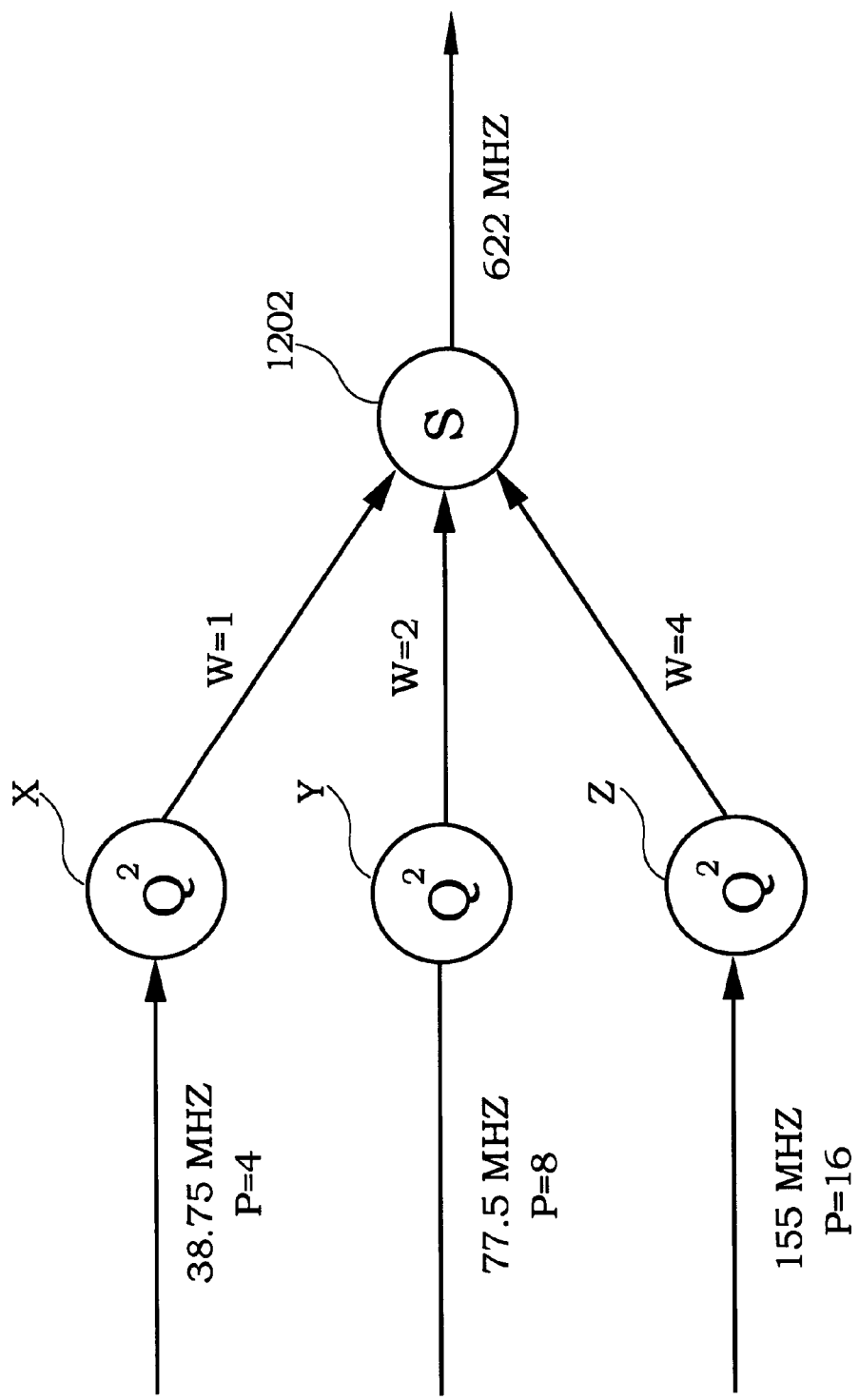
FIG. 12 illustrates, in accordance with one embodiment of the present invention, an inventive period-based scheduling technique.

To further reduce data burstiness, there is provided, in accordance with one embodiment of the present invention, an inventive period-based scheduling technique. To facilitate illustration, FIG. 12 shows an exemplary scheduler 1202, which has a bandwidth of 622 MHz. In general, the speed of the scheduler is predetermined by the design of the scheduler circuit. Three queues of queues X, Y, and Z input into scheduler 1202. Queue of queues Z is accorded a weight of 4 and runs at a rate of 155 MHz Queue of queues Y is accorded a weight of 2 and runs at a rate of 77.5 MHz. Queue of queues X is accorded a weight of 1 and runs at a rate of (77.5/2) MHz. In general, the speed of a queue of queues is defined during connection setup or may be variable for ABR (Available bit rate) connections.

The period associated with queue of queues X is defined as the speed of scheduler 1202 divided by the speed of queue of queues X, (i.e., 622/38.75 or about 16). The period associated with queue of queues Y is defined as the speed of scheduler 1202 divided by the speed of queue of queues Y, (i.e., 622/77.5 or about 8). The period associated with queue of queues Z is defined as the speed of scheduler 1202 divided by the speed of queue of queues Z, i.e., (ie., 622/155 or about 4). The static period associated with each of these queues of queues is defined by its period minus 1. Accordingly, the static period associated with queue of queues X is 15, the static period associated with queue of queues Y is 7, and the static period associated with queue of queues Z is 3.

The static periods are then employed as seed values for determining when a cell should be outputted, and which cell should be outputted, from scheduler 1202 in accordance with one embodiment of the period-based scheduling algorithm. In accordance with one embodiment of the period-based scheduling algorithm, the current count value associated with each queue of queues is set to be equal to its static period initially. Thereafter, all current counts are decremented by one in each iteration of the algorithm. If the current count of any queue of queues reaches zero, two things happen: 1) a cell is outputted from that queue of queues in that iteration of the algorithm and 2) the current count value of that queue of queues is set to be equal to its static period in the next iteration of the algorithm In accordance with the inventive period-based scheduling technique, only one cell is outputted for each iteration of the algorithm. If there are multiple counts have the value of zero during a given iteration, the following two rules operate to resolve the "simultaneous-zeroes" situations. First, if multiple current counts reach the zero value simultaneously in a given iteration of the algorithm the least recently serviced current count is serviced first, i.e., 1) a cell is outputted from the queue of queues associated with that current count in that iteration of the algorithm, and 2) the current count value of that queue of queues is set to be equal to its static period in the next iteration of the algorithm. Second, if multiple current counts reach zero at different times, the most deferred current count gets serviced first.

Figure 13:
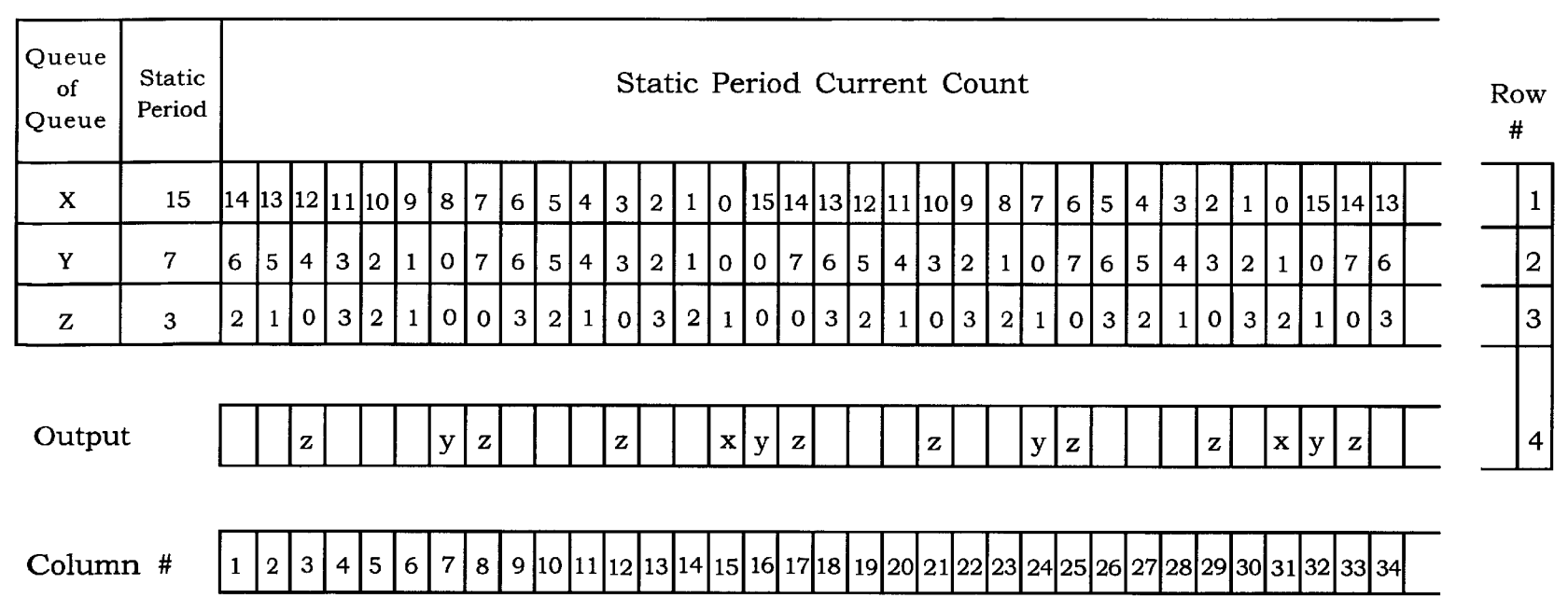

The concept of period-based scheduling is best described in connection with the example of FIG. 13, wherein periods associated with queues of queues X, Y, Z of FIG. 8A are employed as static periods. For ease of reference, the rows of the table have been labeled as seen on the right hand side of FIG. 13. Likewise, the columns of the table have been labeled as seen at the bottom of FIG. 13.

To illustrate, the current counts of queues of queues X, Y, Z are 14, 6, and 2 after the first iteration (R1/C1, R2/C1, and R3/C1), i.e., all current counts are decremented by one from their initial values (which equal to their static periods). After two more iterations, the current count of queue of queues Z is zero (at R3/C3). Accordingly, a cell "z" is outputted from queue of queues Z in the current iteration (at R4/C3), and the current count of queue of queues Z is set to its static period in the next iteration (at R3/C4).

After three more iterations during which all current counts are decremented but none reaches zero to output a cell (at C4, C5, and C6), the current counts associated with queues of queues Y and Z both reach zero simultaneously in column 7. Since queue of queues Y is the least recently serviced of the two, a "y" cell is outputted first (at R4/C7). The current count of queue of queues Y is then set to its static period (at R2/C8) in the next iteration (at C8). Also in this iteration (at C8), the deferred cell "z" from queue of queues Z, which would have been outputted in column 7 but for the need of queue of queues Y to output its cell in column 7, gets outputted (at R4/C8).

After three more iterations during which all current counts are decremented but none reaches zero to output a cell (at C9, C10, and C11), the current count associated with queue of queues Z reaches zero (at C12). Accordingly, a cell "z" is outputted from queue of queues Z in the current iteration (at R4/C12), and the current count of queue of queues Z is set to its static period in the next iteration (at R3/C13).

After two more iterations during which all current counts are decremented but none reaches zero to output a cell (at C13 and C14), the current counts associated with queues of queues X and Y both reach zero (at C15). Since queue of queues X is the least recently serviced of the two, a "x" cell is outputted first (at R4/C15). The current count of queue of queues X is then set to its static period (at R1/C16) in the next iteration (at C16).

Notice that the current count of queue of queues Z also reaches zero in this iteration (C16). However, since queue of queues Y is the most deferred, a cell "y" is outputted in this iteration (R4/C16) instead of a "z" cell. The current count of queue of queues Y is then set to its static period (at R2/C 17) in the next iteration (at C17). Also in this iteration (at C17), the deferred cell "z" from queue of queues Z, which would have been outputted in column 16 but for the need of queue of queues Y to output its cell in column 16, gets outputted (at R4/C17). The current count of queue of queues Z is then set to its static period (at R2/C18) in the next iteration (at C18).

Since simultaneous occurrences of zeroes are resolved through the use of the two "simultaneous-zeroes" rules in the initial stage, fewer and fewer occurrences of simultaneous zeroes occur after the system reaches its steady state. By way of example, simultaneous zeros substantially disappear after about column 31 in the table of FIG. 13 (in contrast to earlier columns). The pattern of cells outputted from scheduler 1202 is x/y/zz/y/zz (and repeat as seen starting in column 15 and again starting in column 31).

Although the "z" cells are outputted sequentially, they are not outputted in consecutive iterations. Instead, they are separated by three iterations (e.g., in columns 18/19/20 and columns 26/27/28) during which no cells are outputted. Accordingly, the sequential output of cells "z" (e.g., in columns 17/21 and columns 25/29) does not constitute a data burst and does not increase the probability of back-pressuring the Z connection. Further note that cells that are outputted consecutively from the scheduler (e.g., cell pattern "xyz" at columns 15, 16, and 17 or cell pattern "yz" at columns 24 and 25) do not belong to the same queue of queues. Consequently, these consecutively outputted cells do not form a data burst that may increase the probability that a particular connection may be back-pressured.

Since only approximately 7/16 of the bandwidth of scheduler 1202 is employed, there are gaps in between outputted cells (e.g., gaps of columns 18, 19, 20, 22, 23, 26, 27, 28, and 30). For every sixteen iterations, an "x" cell, two "y" cells, and four "z" cells are outputted, with the remainder being gaps.

Figure 14:
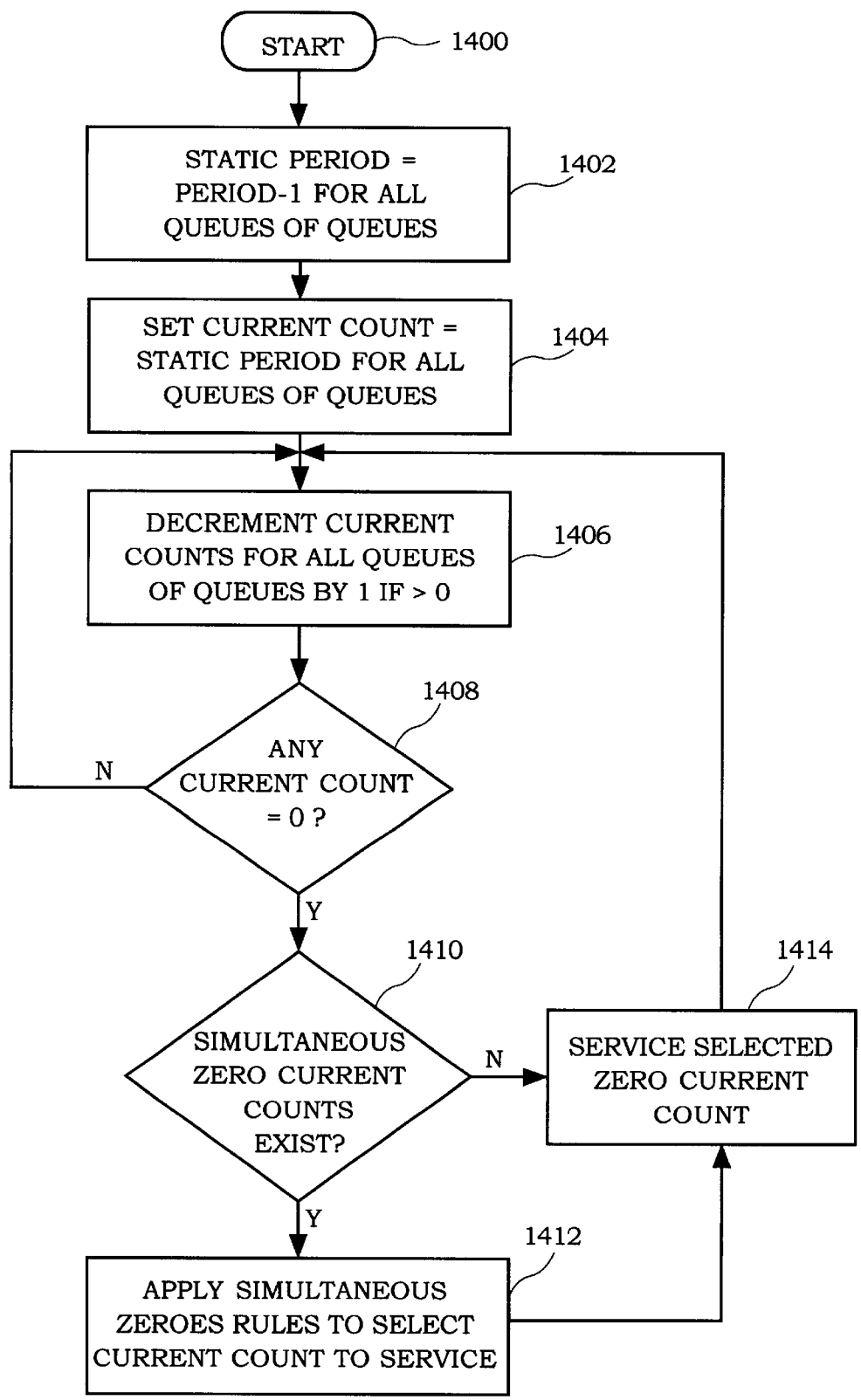
FIGS. 14, 15, and 16 illustrate, in accordance with one embodiment of the present invention, the steps involved in the period-based scheduling technique of the present invention.

FIG. 14 illustrates, in accordance with one embodiment of the present invention, the steps involved in the period-based scheduling technique of the present invention. It should be borne in mind that the steps of FIG. 14 is but one implementation of the period-based scheduling technique discussed in connection with FIGS. 12 and 13; other implementations will be readily apparent to those skilled in the art in view of this disclosure. In step 1402, the static period for each queue of queues is set to be equal to its period minus 1. As mentioned earlier, the period of a queue of queues equals to the speed of the scheduler divided by the speed of that queue of queues. In step 1404, the current counts for all queues of queues are set to be equal to their static periods.

In step 1406, the current count for each queue of queues is decremented by 1 if that current count value is greater than zero, i.e., if it is not already zero. As will be discussed later, the current count may be zero prior to decrementing if, for example, there are deferred zero current counts to be serviced from the last iteration. In step 1408, it is ascertained whether any current count equals to zero in the current iteration. If not, the method returns to step 1406 to continue decrementing the current counts for all queues of queues. On the other hand, if there is at least one current count having the value zero, the method proceeds to step 1410 where it is ascertained whether simultaneous zero current counts exist in the current iteration (i.e., two or more current counts have the value zero).

If it is ascertained in step 1410 that simultaneous zero current counts exist, the method proceeds to step 1412 wherein the two aforementioned "simultaneous-zeroes" rules are applied to determine which current count should be serviced first. Step 1412 is discussed later in detail in a subsequent FIG. 15.

Thereafter, the method proceeds to step 1414 wherein the selected current count is serviced. Step 1414 is discussed later in detail in a subsequent FIG. 16. If it is determined in step 1410 that no simultaneous zero current counts exists (i.e., there is only a single zero current count), the single zero count is serviced in step 1414.

From step 1414, the method returns to step 1406 wherein the current count for each queue of queues is decremented by 1 if that current count value is greater than zero, i.e., if it is not zero. If there were-simultaneous zero current counts in the previous iteration (as determined in step 1410), for example, only one current count will be serviced (in step 1414) and the remaining, deferred zero current count(s) will still have the value of zero in the current iteration as the method returns to step 1406 from step 1414 to attempt to decrement all current counts in step 1406.

The deferred zero current count will now be serviced as the method proceeds through steps 1408, 1410, and 1414 (assuming there is only one deferred zero current count and there is no new zero current counts). If there are multiple deferred zero current counts or if there are new zero current counts in this iteration, one of these multiple simultaneous zero current counts will be serviced as the method proceeds through steps 1408, 1410, 1412, and 1414.

Figure 15:
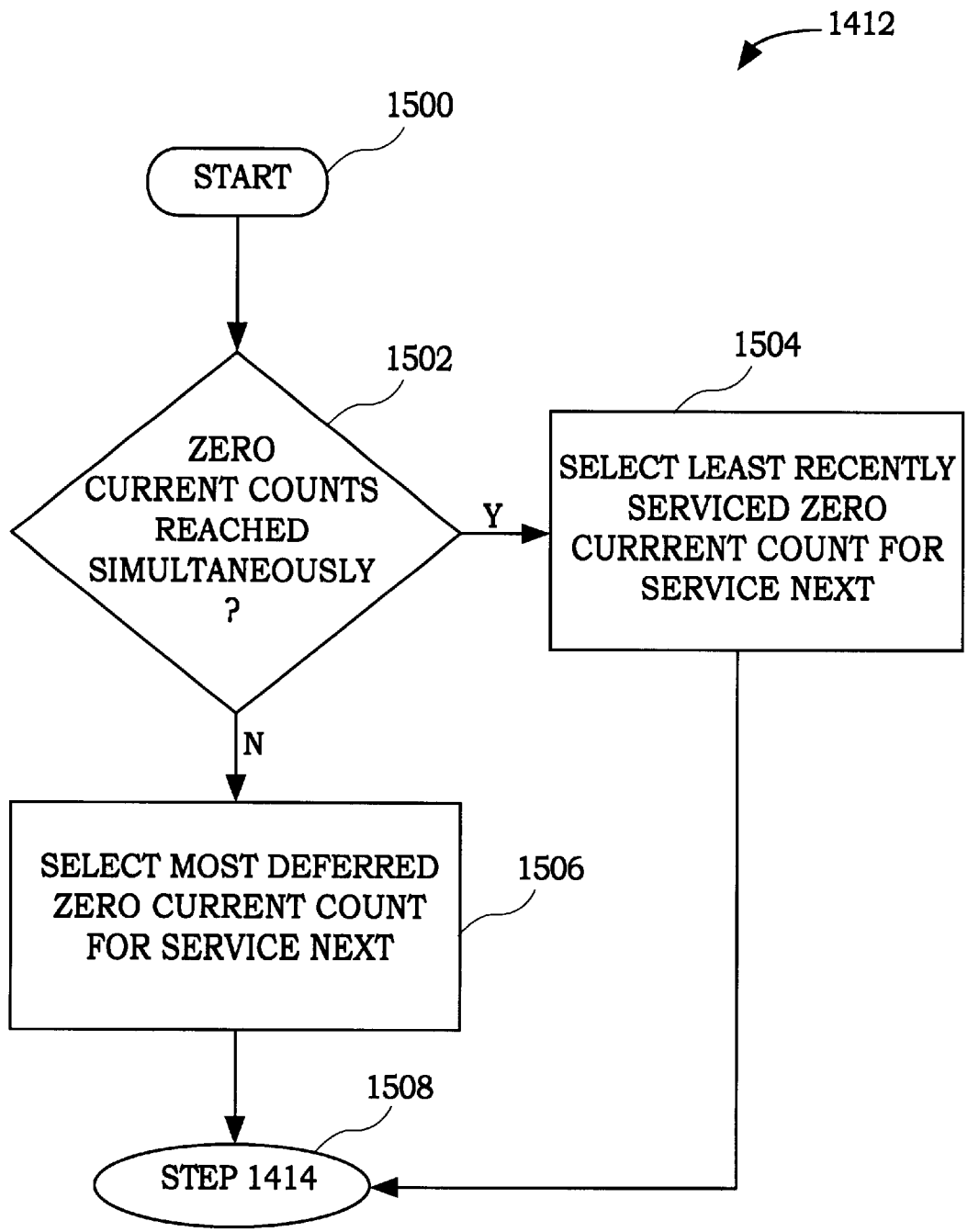

FIG. 15 illustrates, in accordance with one embodiment of the present invention, step 1412 of FIG. 14. In step 1502, the method ascertains whether all zero current counts are reached simultaneously in the current iteration. If the zero current counts are reached simultaneously, the method proceeds to step 1504 wherein the least recently serviced zero current count of the simultaneous multiple zero current counts is selected to be serviced next (i.e., serviced in step 1414 of FIG. 14). On the other hand, if the zero current counts are not reached simultaneously (as ascertained in step 1502), the method proceeds to step 1506, wherein the most deferred zero current count is selected to be serviced next (i.e., serviced in step 1414 FIG. 14). From either step 1504 or 1506, the method proceeds to step 1508, representing the return to step 1414 of FIG. 14 wherein the selected zero current count is serviced.

Figure 16:
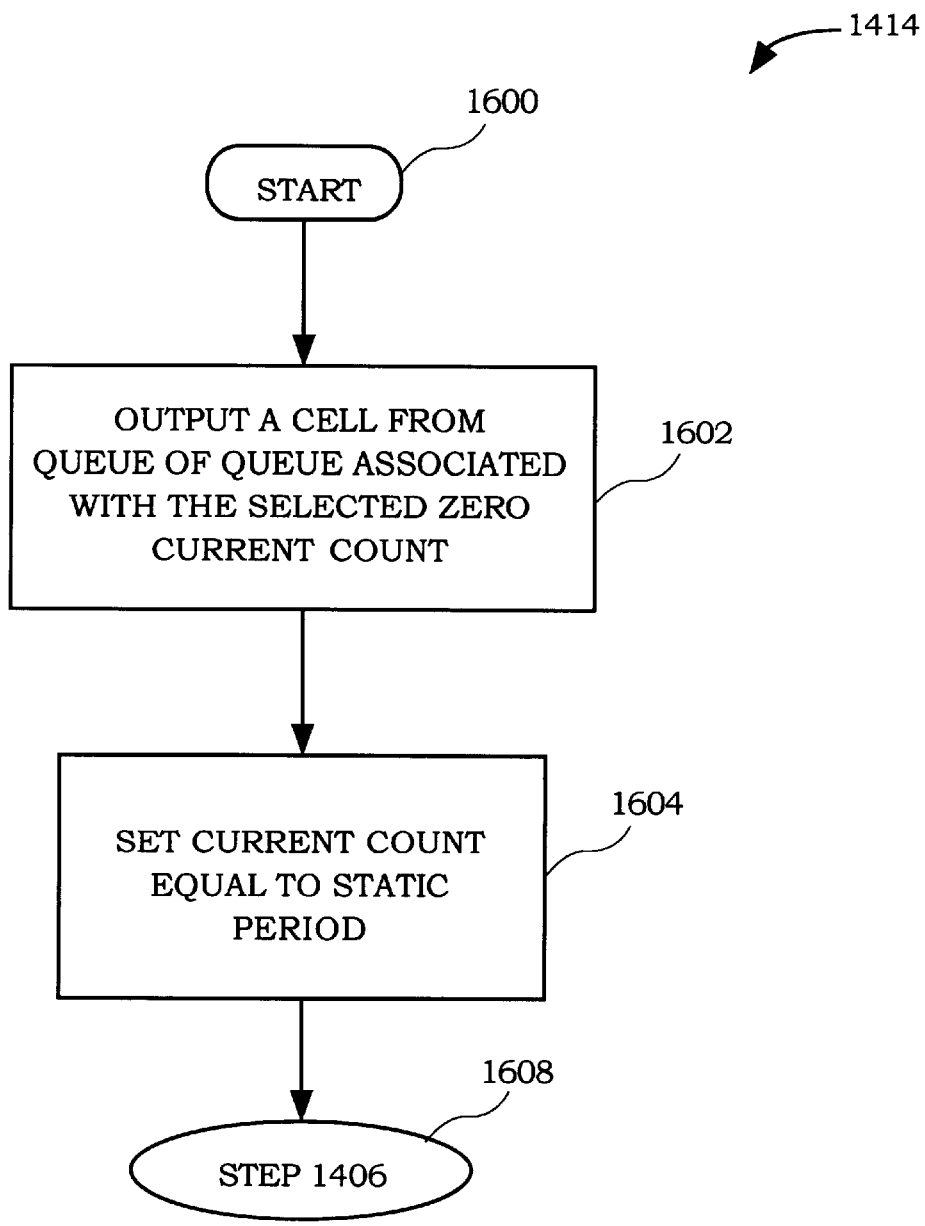

FIG. 16 illustrates, in accordance with one embodiment of the present invention, step 1414 of FIG. 14. In step 1602, a cell is outputted in the current iteration from the queue of queues associated with the selected zero current count. In step 1604, the current count recently serviced is set to be equal to the static period in the next iteration. Thereafter, the method proceeds to step 1608, representing the return to step 1406 of FIG. 14 wherein the method proceeds to through another iteration to determine which, if any cell, should be outputted next from the scheduler.

FIG. 17 illustrates another example of period-based scheduling technique wherein substantially the entire bandwidth of the scheduler is employed. In FIG. 17, the period associated with queues X, Y, and Z of FIG. 8 are employed as static periods. For ease of reference, the rows of the table of FIG. 17 have been labeled as seen on the right hand side of FIG. 17. Likewise, the columns of the table have been labeled as seen at the bottom of FIG. 17.

To illustrate, the current counts of queues of queues X, Y, and Z are 1, 3, and 3. After the first iteration, the current counts of queues of queues X, Y, and Z are 0, 2, and 2 respectively (R1/C1, R2/C1 and R3/C1), i.e., all current counts are decremented by 1 from their initial values (which equal to their static periods). Since the current counts of queues of queues X is 0 (at R1/C1), a cell "x" is outputted from queue of queues X in this iteration (at R4/C1), and the current counts of queues of queues X is set to its static period in the next iteration (at R1/C2).

In this next iteration (C2) the current counts of queues of queues Y and X are decremented by one from their values of the previous iteration (C1). In the next iteration (C3), decrementing the current count of queues of queues X, Y, and Z causes all the current counts to reach 0 simultaneously. Since queues of queues X was most recently serviced, either queues of queues Y or Z may be serviced next. The decision whether queue of queues Y or queue of queues Z is serviced next may be arbitrary at this point or may be predicated upon some predefined priority scheme. (Since both are least recently serviced).

If queue of queues Y is serviced in the current iteration (C3) a cell "y" is outputted (at R4/C3) and the current count of queue of queues Y is set to its static period in the next iteration (at R2/C4). Since the neither queues of queues X and Z are serviced in iteration C3, their current count values of 0 are carried over to the next iteration (at R1/C4 and R3/C4).

In iteration C4, between queues of queues X and Z, queue of queues Z is the least recently serviced of the two (since queue of queues X was serviced back in column C1). Queue of queues Z is serviced in this iteration (C4) and a cell "z" is output in the current iteration (at R4/C4). Thereafter, the current count of queue of queues Z is set to its static period in the next iteration (at R3/C5). The current count value zero of queue of queues X, which was unserviced in iteration (C4), is carried over to iteration C5. The current count of queues of queues Y, being a non-zero value, is decremented by one to two (at R2/C5).

In this iteration C5, only queue of queues X has a current count value of 0. Consequently, queue of queues X is serviced in iteration C5, which causes a cell "x" to be outputted (at R4/C5). The current count associated that with queue of queues X is then set to its static value (at R1/C6). In iteration C6, decrementing queues of queues Y and Z does not result in a 0 current value (see R2/C6 and R3/C6). Since no current count is at 0, no cell is outputted (at R4/C6). The operation of the period-based scheduling of the remainder of the table of FIG. 17 is left to the reader as an exercise. Nevertheless, it can be seen in FIG. 17 that after column C7, a cell is outputted for every iteration of the period-based scheduling technique As can be seen, data bursts are substantially eliminated, even when the entire bandwidth is employed. Accordingly, the inventive period-based scheduling technique substantially minimizes the possibility of back-pressuring connections.

While this invention has been described in terms of several preferred embodiments, there are alterations, permutations, and equivalents which fall within the scope of this invention. By way of example, although the inventive cell scheduling techniques disclosed herein have been discussed, in many cases, in the context of the ATM switch of the preferred embodiment for ease of understanding, it should be understood that these inventive techniques are not so limited. In fact, the inventive cell scheduling techniques may be employed with any type of cells or data packets, whether or not ATM-related. Accordingly, the inventive cell scheduling techniques may be employed on a variety of data switches which switch cells or packets among connections, virtual connections, or ports (including those adapted for ATM and Ethernet or any other cell-based or packet-based protocols). Further, the flow charts included herein illustrate but some approaches to implementing the disclosed cell scheduling techniques. Other approaches utilizing skills commonly possessed by those skilled in the art can readily be substituted, as can be readily appreciated by those skilled in the art given this disclosure. It is therefore intended that the following appended claims be interpreted as including all such alterations, permutations, and equivalents as fall within the true spirit and scope of the present invention.

What is claimed is:

1. A computer-implemented method for scheduling cells output on an output path of a data switch, said data switch being configured for switching said cells from a plurality of input paths to said output path, comprising:

providing a plurality of queues, each queue of said plurality of queues having an assigned weight, respective ones of said plurality of input paths being coupled to respective ones of said plurality of queues;

providing a plurality of queues of queues, said plurality of queues being coupled to said plurality of queues of queues with queues of said plurality of queues having a similar weight being logically coupled in a static manner to a same queue of queues of said plurality of queues of queues, each of said plurality of queues of queues has a queue of queues weight that is equal to a queue weight of queues coupled to said each of said plurality of queues of queues; and providing a scheduler, said plurality of queues of queues being input into said scheduler, said scheduler being coupled to said output path, said scheduler outputs cells from each of said plurality of queues of queues in a round robin manner in accordance to said queue of queues is accorded to said each of said plurality of queues of queues.

2. The method of claim 1 wherein said plurality of input paths represent virtual connections.

3. The method of claim 1 wherein said plurality of input paths represent input ports.

4. The method of claim 1 wherein each of said queues of queues receives cells from queues coupled to said each of said queues of queues in a round robin manner.

5. The method of claim I wherein cells of the same weight are interleaved on said output path if said cells of the same weight traverse different ones of said plurality of queues.

6. The method of claim 1 wherein said scheduler is employed to schedule cells on a per priority basis.

7. The method of claim I wherein said scheduler is employed to schedule cells on a per traffic class basis.

8. An arrangement for scheduling cells output on an output path of a data switch, said arrangement being configured for switching said cells from a plurality of input paths to said output paths, comprising:

a plurality of queues, each queue of said plurality of queues having an assigned weight, respective ones of said plurality of input paths being coupled to respective ones of said plurality of queues;

a plurality of queues of queues, said plurality of queues being coupled to said plurality of queues of queues, a given queue of queues of said plurality of queues of queues being logically coupled in a static manner only to individual ones of said plurality of queues having the same assigned weight, each of said queues of queues receives cells from queues coupled to said each of said queues of queues in a round robin manner; and a scheduler coupled to receive cells from said plurality of queues of queues and to output cells to said output path, wherein said cells are output from said scheduler in a round robin manner from said plurality of queues of queues in accordance to queue of queues weights accorded to said plurality of queues of queues, each of said plurality of queues of queues has a queue of queues weight that is equal to a queue weight of queues coupled to said each of said plurality of queues of queues.

9. The arrangement of claim 6 wherein said plurality of input paths represent virtual connections.

10. The arrangement of claim 6 wherein said plurality of input paths represent input ports.

11. The arrangement of claim 6 wherein said scheduler outputs cells from each of said plurality of queues of queues in a round robin manner in accordance to said queue of queues weight accorded to said each of said plurality of queues of queues.

12. The arrangement of claim 6 wherein said scheduler is employed to schedule cells on a per priority basis.

13. The arrangement of claim 6 wherein said scheduler is employed to schedule cells on a per traffic class basis.

* * * * *